| (12) | United States Patent<br>Nishi et al. | (10) Patent No.: US 8,014,898 B2<br>(45) Date of Patent: Sep. 6, 2011 |
|---|---|---|

(54) CONTROLLER OF ROBOT USED COMBINED WITH MACHINE TOOL

(75) Inventors: Hiroji Nishi, Minamitsuru-gun (JP); Yoshitaka Ikeda, Minamitsuru-gun (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 0 days.

(21) Appl. No.: 12/691,177

(22) Filed: Jan. 21, 2010

(65) Prior Publication Data

US 2010/0211220 A1     Aug. 19, 2010

(30) Foreign Application Priority Data

Feb. 17, 2009   (JP) .................................. 2009-034164

(51) Int. Cl.
 *G05B 19/418*   (2006.01)
(52) U.S. Cl. ........ 700/248; 700/159; 700/169; 700/181; 700/245; 700/247; 901/5; 901/6; 901/7; 901/8; 901/9; 318/565; 318/570; 318/590; 318/568.13; 318/568.15; 82/122; 82/138; 82/149; 82/160; 483/29; 483/58; 483/59
(58) Field of Classification Search .................. 700/159, 700/169, 181, 245, 247; 901/5, 6, 7, 8, 9, 901/14, 15, 17, 18, 21, 22, 23, 26, 29, 30, 901/31, 37, 39, 41, 42, 45, 46, 49; 414/730, 414/735, 738, 144.3, 744.6; 318/565, 570, 318/568.13, 568.15, 590; 82/122, 138, 149, 82/160; 483/29, 58, 59
See application file for complete search history.

(56) References Cited

U.S. PATENT DOCUMENTS

| 4,870,592 A | * | 9/1989 | Lampi et al. .................. 700/112 |
| 5,150,288 A | * | 9/1992 | Imai et al. .......................... 700/3 |
| 5,555,179 A | * | 9/1996 | Koyama et al. ................. 700/95 |
| 5,822,207 A | * | 10/1998 | Hazama et al. ................. 700/97 |

(Continued)

FOREIGN PATENT DOCUMENTS

JP      7-114402      5/1995

(Continued)

OTHER PUBLICATIONS

Japanese Notice of Reasons for Rejection mailed May 18, 2010 issued in Japanese Application No. 2009-034164 (including a partial translation thereof).

*Primary Examiner* — James P Trammell
*Assistant Examiner* — McDieunel Marc
(74) *Attorney, Agent, or Firm* — Drinker Biddle & Reath LLP

(57) ABSTRACT

A robot controller (7) controlling a robot (1) used combined with a machine tool (5, 6) provided with a communication unit (9) connecting the robot controller to a machine tool, a detection unit (52) detecting through the communication unit a type and number of machine tools, and a setting unit (55) setting the robot controller based on the type and number of machine tools detected by the detection unit. Due to this, machine tool and robot startup work can be simply and easily performed without requiring skill or increasing the startup man-hours. The setting unit selects one setting file from among a plurality of setting files for the robot controller, stored in the robot controller, based on the type and number of machine tools detected by the detection unit.

4 Claims, 17 Drawing Sheets

U.S. PATENT DOCUMENTS

| | | | |
|---|---|---|---|
| 6,243,611 B1 * | 6/2001 | Hazama et al. | 700/97 |
| 6,274,839 B1 * | 8/2001 | Stone et al. | 219/76.12 |
| 6,681,151 B1 * | 1/2004 | Weinzimmer et al. | 700/259 |
| 7,127,325 B2 * | 10/2006 | Nagata et al. | 700/245 |
| 7,487,117 B1 * | 2/2009 | Tamura et al. | 705/27 |
| 2004/0172159 A1 * | 9/2004 | Noda et al. | 700/225 |
| 2006/0161291 A1 * | 7/2006 | Ikeda et al. | 700/200 |
| 2008/0058993 A1 * | 3/2008 | Tain et al. | 700/275 |
| 2008/0181136 A1 * | 7/2008 | Watanabe et al. | 370/255 |
| 2009/0198370 A1 * | 8/2009 | Nishi et al. | 700/184 |
| 2010/0087947 A1 * | 4/2010 | Chuang | 700/164 |

FOREIGN PATENT DOCUMENTS

| | | |
|---|---|---|
| JP | 2007268585 | 10/2007 |
| JP | 2008197856 | 8/2008 |

* cited by examiner

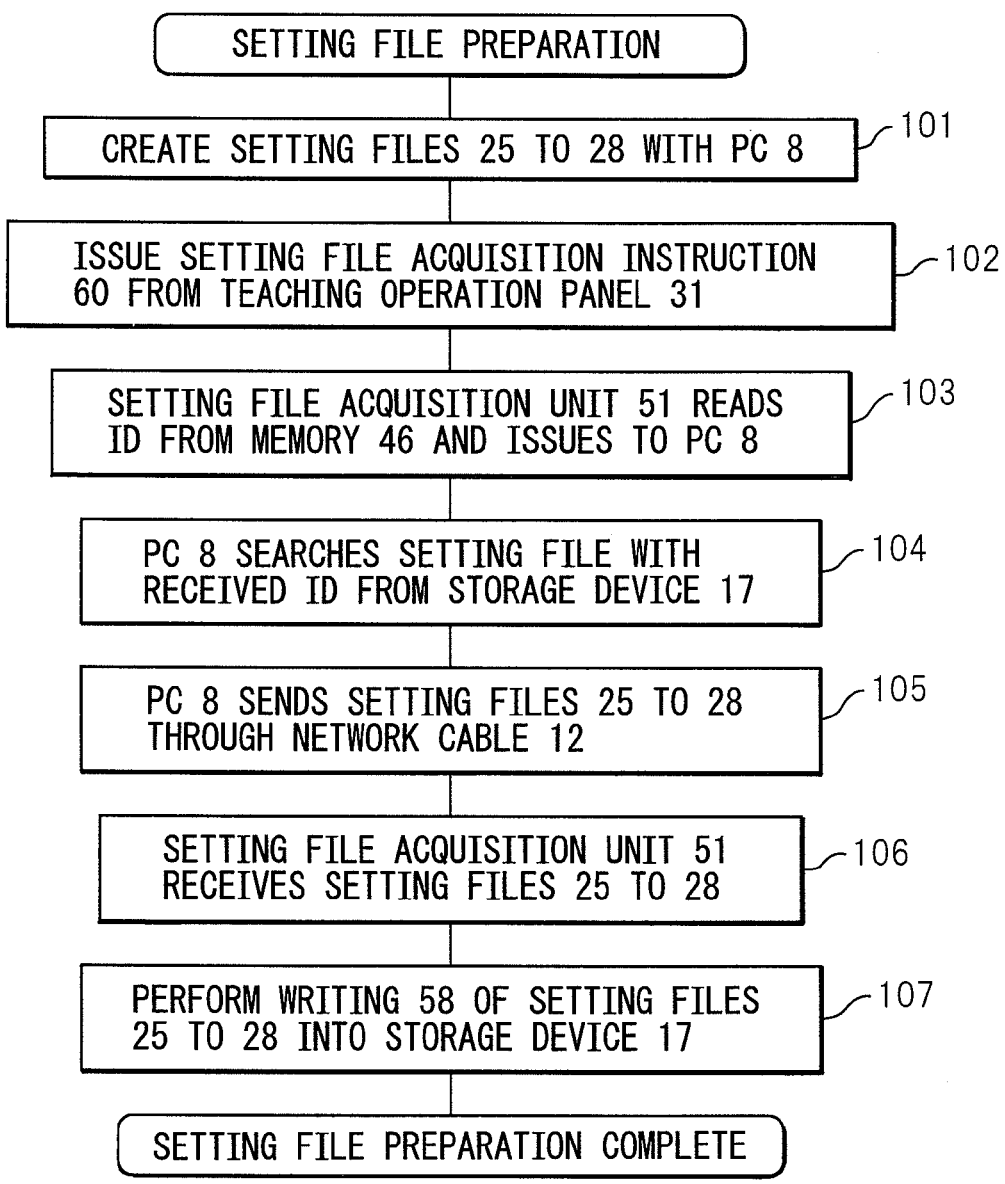

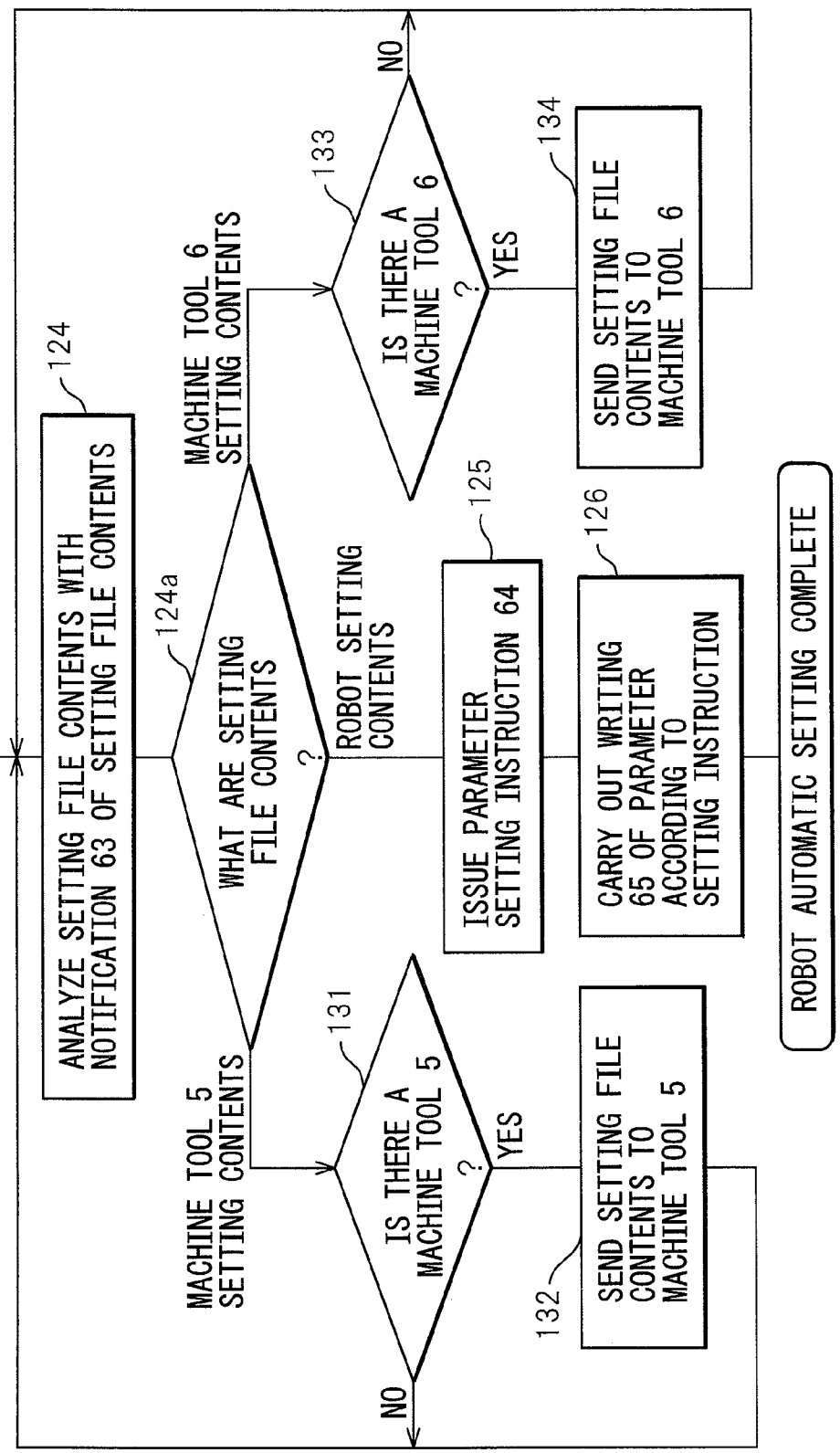

Fig.16

RECEIVED ID MANAGEMENT TABLE

| MACHINE NUMBER | NETWORK ADDRESS | PART NUMBER | NODE NUMBER |
|---|---|---|---|
| MODEL1016 | 190.5.90.100 | MA4311683 | 1 |
| MODEL1016 | 190.5.90.101 | MA4311684 | 2 |
| MODEL1016 | 190.5.90.102 | MA4311685 | 3 |

CONTROLLER OF ROBOT USED COMBINED WITH MACHINE TOOL

RELATED APPLICATION DATA

This application claims priority under 35 U.S.C. §119 and/or §365 to Japanese Application No. 2009-034164, filed Feb. 17, 2009, the entire contents of which are incorporated herein by reference.

BACKGROUND OF THE INVENTION

1. Field of the Invention

The present invention relates to a robot controller controlling robots used combined with machine tools.

2. Description of the Related Art

The work of supplying a workpiece material to a machine tool and the work of taking out a finished workpiece machined by the machine tool from the machine tool are together called "loading and unloading work". A machine tool is expensive, so operating it for a full 24 hours is preferable, but to accomplish that, the workers performing the loading and unloading work have to be made to work for long hours.

However, workplaces for processing workpiece materials by machine tools are hostile environments with cutting oil and dust from deburring in the air. Further, when the weight of the workpiece is comparatively heavy, there are times when the worker is physically at risk. Therefore, it is difficult for workers to perform loading and unloading work for long periods of time. Thus, loading and unloading work by robots instead of workers is desirable (see Japanese Unexamined Patent Publication (A) No. 7-114402).

When robots are used in place of workers, for using the machine tool and robot in combination, various start-up work is necessary when installing the machine tool and robot.

For example, various interlock signals have to be sent and received through a signal cable between the machine tool and robot. For such signal transmission, a signal cable has to be suitably laid between the machine tool and robot, and the machine tool and robot set so as to be able to accurately send and receive signals. Note that, as a signal cable, an analog signal cable or a network handling digital signals is used.

Interlock signals sent and received between the robot and machine tool differ depending on the work content of the robot in the production system, so the logical meaning of each signal also differs for each production system. The work for setting which signal of the robot to connect with which signal of the machine tool and what logical meaning each signal has is called "signal assignment work".

Such signal assignment work is carried out manually and thus takes an extremely long time when the number of signals is high. Further, the signal assignment work must be carried out on both the robot and machine tool. Further, when accurate assignment work is not carried out on both the robot and machine tool, the signal output from either the robot or machine tool will end up being input for a signal with a different meaning at the other of the robot or machine tool causing a problem of the interlock not properly working.

Further, it is necessary to set a coordinate system common to the robot and machine tool in both the robot and machine tool matching the relative positional relationship of the robot and machine tool and define the loading and unloading operations of the robot based on this common coordinate system. For example, the standby position until the automatic door of the machine tool opens, the entry path into the machine tool, the position of holding the workpiece, the exit path to outside of the machine tool, and the like are set using this common coordinate system in the robot.

Similarly, in the machine tool also, the finished workpiece must be moved to the holding position of the robot using the common coordinate system. The common coordinate system is thereby crucial for the operations of both the robot and machine tool. When the coordinate system of the robot and the coordinate system of the machine tool differ, loading and unloading work of a workpiece cannot be carried out accurately.

Further, the relative correspondence of the machining program run at the machine tool and the loading and unloading work program run at the robot must be set in both the machine tool and robot. When machining different types of workpieces with a machine tool, machining programs differing for each type of workpiece are run at the machine tool. Similarly, when loading and unloading different types of workpieces with a robot, the position and posture for holding each workpiece differ, so a loading and unloading work program must be prepared for each type of workpiece.

It is necessary to prepare a part number for each type of workpiece, set the machining program to be run for the part number at the machine tool, and set the work program to be run for the part number at the robot. Preferably, the robot is informed of the part number of the workpiece by the machine tool with an interlock signal, and the loading and unloading work program corresponding to the part number is automatically run by the robot. However, if a conflict is generated in the relative correspondence of the machining program of the machine tool and the work program of the robot, the workpiece cannot be accurately loaded and unloaded.

In cases when a robot is used for loading and unloading work of a workpiece to and from a machine tool, when installing and starting up the machine tool, it is necessary to carry out, in addition to the machine tool startup work, startup work for each setting with respect to the robot as well. Further, the contents of the machine tool startup work and the robot startup work differ, so both an operator well versed in machine tools and an operator well versed in robots are necessary. In this way, to start up one production system, there must be two operators, so training costs and training periods to train such operators are necessary.

Further, not only do the man-hours for robot startup work increase, but also steps for connecting to the robot, which had been conventionally unnecessary in the past, are needed in machine tool startup. Therefore, such additional steps will increase the startup costs. The increase in startup costs is a problem when using a robot for loading and unloading work of a workpiece at a machine tool.

Further, even when the cost problems could be solved, since the machine tool startup operator and the robot startup operator were different, there had been cases of inconsistencies between the contents of the settings of the machine tool and the contents of the settings of the robot. In particular, when there were different types of machine tools and/or different types of robots, the contents of startup work also differed according to the types of machine tools and robots, so a high level of skill was necessary. Therefore, a purchaser of the machine tools and robots had to study the startup work for both or else employ startup workers or could not use the machine tools and robots.

The present invention was created in light of this situation and has as its object to provide a robot controller able to simply and easily perform machine tool and robot startup work without requiring skill or increasing startup man-hours.

SUMMARY OF THE INVENTION

According to a first aspect for achieving the aforementioned object, there is provided a robot controller controlling a robot used combined with machine tools, the robot controller provided with a communication unit connecting the robot controller to the machine tools, a detection unit detecting through the communication unit a type and number of the machine tools, and a setting unit setting the robot controller based on the type and number of the machine tools detected by the detection unit.

According to a second aspect, in the first aspect, the setting unit selects one setting file from a plurality of setting files for the robot controller stored in the robot controller based on the type and number of the machine tools detected by the detection unit.

According to a third aspect, in the first or second aspect, the detection unit uses a signal transmitted from the machine tool to the robot controller and uniquely determined based on the type of the machine tool to detect a type and number of machine tools.

According to a fourth aspect, there is provided a robot controller controlling robots used combined with a machine tool, the robot controller provided with a communication unit connecting the robot controller to the machine tool, a notification unit notifying through the communication unit a type and number of the robots, and a setting unit setting the robot controller based on setting information transmitted from the machine tool through the communication unit.

According to a fifth aspect, in the fourth aspect, the setting information is information recorded in one setting file selected based on the type and number of the robots from a plurality of setting files for the robot controller stored in the machine tool.

According to a sixth aspect, in the fourth or fifth aspects, the notification unit uses a signal transmitted from the machine tool to the robot controller and uniquely determined based on the type of the machine tool to notify the type and number of the robots.

According to a seventh aspect, in the second or fifth aspects, the selected setting file has recorded in it setting information of the robots and setting information of the machine tool, and, when installing settings of the robot based on setting information of the robot recorded in the selected setting file, the controller sets the machine tool based on the setting information of the machine tool recorded in the setting file.

These and other objects, features, and advantages of the present invention will be more apparent in light of the detailed description of exemplary embodiments thereof as illustrated by the drawings.

BRIEF DESCRIPTION OF THE DRAWINGS

FIG. 5 is a view showing a flowchart explaining a procedure for preparation of a setting file;

FIG. 7 is a second view showing a flowchart explaining an automatic setting procedure for a robot based on another embodiment;

FIG. 16 is a view showing a received ID management table.

DESCRIPTION OF THE PREFERRED EMBODIMENTS

Figure 1:
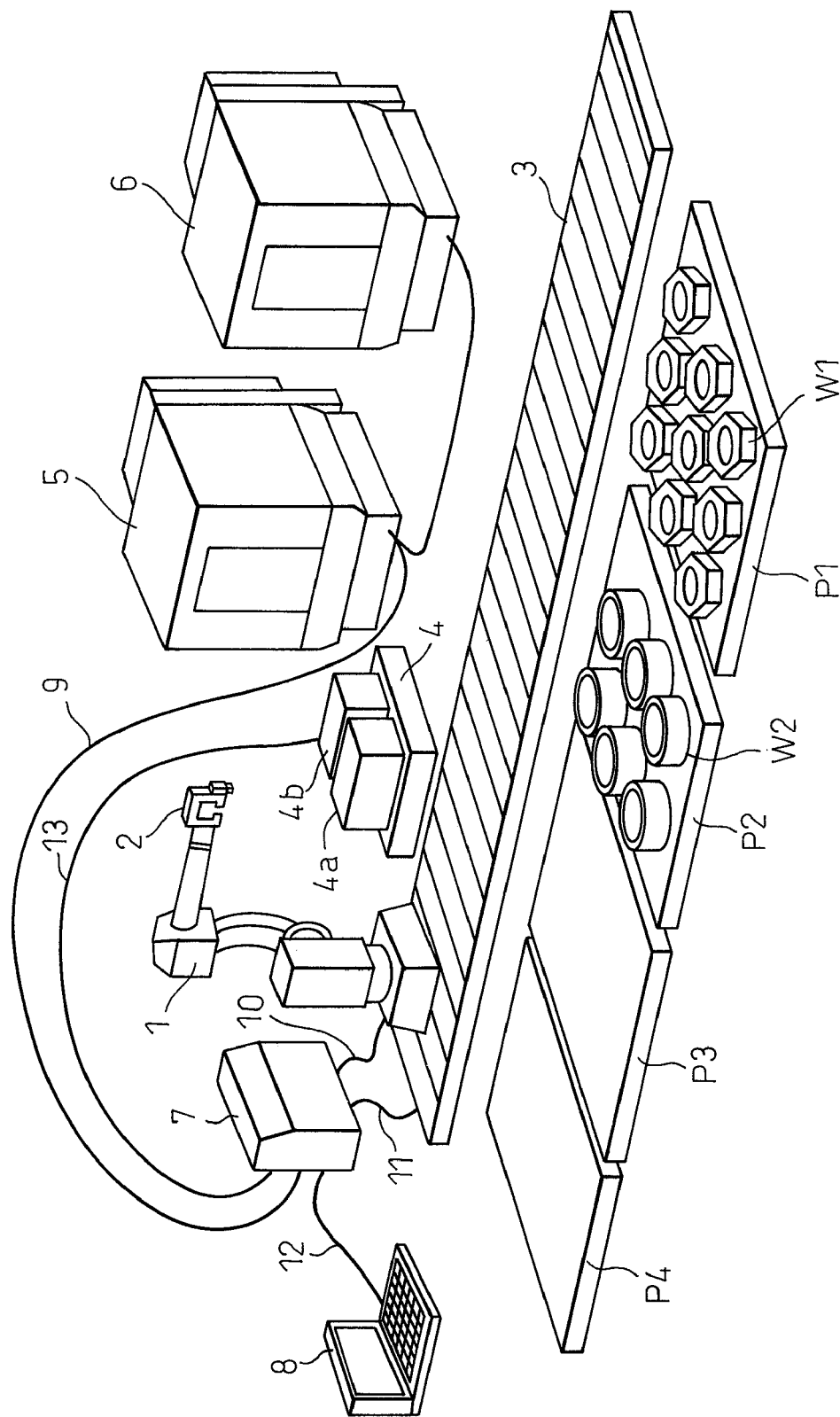
FIG. 1 is a perspective view showing a production system including machine tools, a robot, and a robot controller based on the present invention.

Below, preferred embodiments of the present invention will be explained with reference to the attached drawings. In the drawings, similar members are assigned similar reference numerals. To facilitate understanding, these drawings are suitably changed in scale.

FIG. 1 is a perspective view showing a production system including machine tools, a robot, and a robot controller based on the present invention. As shown in FIG. 1, a work tool 2 is attached to a wrist end of a robot 1. The robot 1 is installed so as to be able move on a rail axis 3.

Four pallets P1, P2, P3, and P4 for carrying workpieces are arranged along the rail axis 3 in order at one side of the rail axis 3. As shown in the drawing, a plurality of workpieces W1 are carried on the pallet P1. Further, workpieces W2 different in type from the workpieces W1 are carried on the pallet P2. Further, a temporary loading platform 4 and machine tools 5 and 6 are arranged at the other side of the rail axis 3.

The robot 1 uses the work tool 2 to grip the workpiece W1 on the pallet P1 and the workpiece W2 on the pallet P2 and place them on the temporary loading platform 4. Further, when the machine tool 5 is not machining, a workpiece W1 placed on the temporary loading platform 4 is gripped by the robot 1 by the work tool 2 and mounted at the machine tool 5.

Then, the robot 1 issues a machining start command to the machine tool 5. The machine tool 5 begins machining of the workpiece W1 by the machining command from the robot 1. Further, once machining is complete, the machine tool 5 sends a machining completion signal to the robot 1. The robot 1 receiving the machining completion signal takes out the finished workpiece W1 from the machine tool 5 and places the workpiece W1 on the pallet P3.

Similarly, when the machine tool 6 is not machining, a workpiece W2 placed on the temporary loading platform 4 is gripped by the robot 1 by the work tool 2 and mounted at the machine tool 6. Then, the robot 1 issues a machining start command to the machine tool 6. The machine tool 6 begins machining of the workpiece W2 by the machining command from the robot 1. Further, once machining is complete, the machine tool 6 sends a machining completion signal to the robot 1. The robot 1 receiving the machining completion signal takes out the finished workpiece W2 from the machine tool 6 and places the workpiece W2 on the pallet P4.

As shown in FIG. 1, the robot 1 and the rail axis 3 are connected by cables 10 and 11 to a robot controller 7. Therefore, the operations of the robot 1 and rail axis 3 are controlled by the robot controller 7. The robot controller 7 is connected by a network cable 12 to a PC 8.

Further, the robot controller 7 and temporary loading platform 4 are connected by a digital signal I/O cable 13. Further, the temporary loading platform 4 has attached to it a positioning jig 4a for workpieces W1 and a positioning jig 4b for workpieces W2. Further, the robot controller 7 and machine tools 5 and 6 are connected by a network cable 9.

Figure 2:
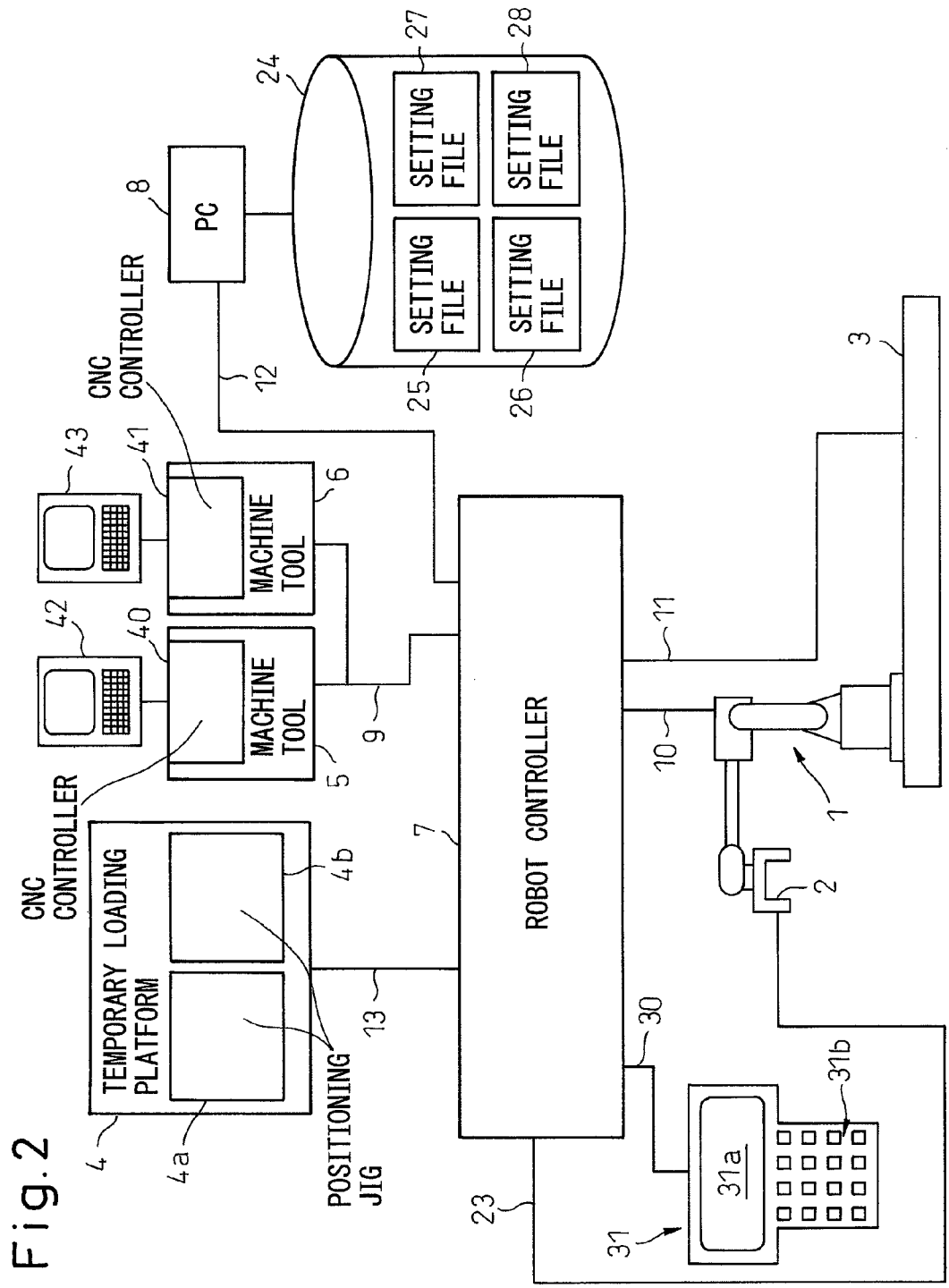
FIG. 2 is a schematic view of a production system including machine tools, a robot, and robot controller based on the present invention.
Figure 3:
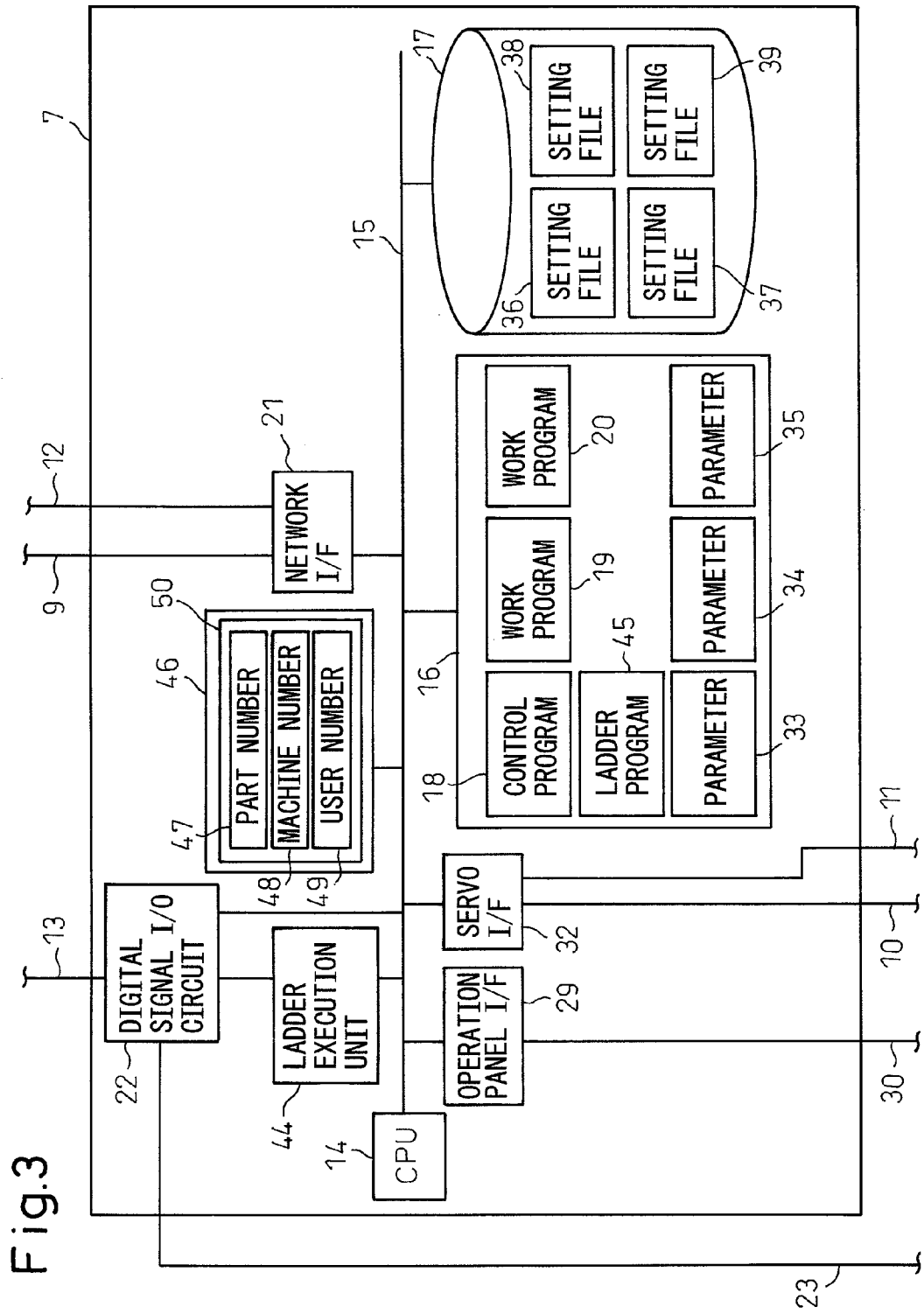
FIG. 3 is a schematic view showing the robot controller shown in FIG. 2.

FIG. 2 is a schematic view of a production system including machine tools, a robot, and a robot controller based on the present invention. Further, FIG. 3 is a schematic view of the robot controller shown in FIG. 2. As shown in FIG. 3, the robot controller 7 is provided with a CPU 14, a memory 16, a storage device 17, and the like all connected to each other by a bus 15.

As shown in FIG. 3, the memory 16 stores a control program 18 run by the CPU 14 and controlling the robot controller as a whole and work programs 19 and 20. The purpose of the work program 19 is to make the robot 1 use the work tool 2 to carry out work relating to the workpieces W1, while the purpose of the work program 20 is to make the robot 1 use the work tool 2 for work relating to the workpieces W2. Both of these work programs 19 and 20 are interpreted using the control program 18 and converted to operations of the robot 1, rail axis 3, and work tool 2. Further, the memory 16 stores various types of parameters 33, 34, and 35.

The robot controller 7 is provided with a servo interface 32. As is clear from FIG. 2 and FIG. 3, the servo interface 32 is connected through a cable 10 to the robot 1 and connected through a cable 11 to the rail axis 3. Therefore, operational commands from the robot controller 7 are conveyed to the motors of the robot 1 and the rail axis 3 whereby the robot 1 and rail axis 3 operate.

Further, the robot controller 7 is provided with a network interface 21. The network interface 21 is connected through the network cable 12 to the PC 8. Further, the robot controller 7 is provided with a digital signal I/O circuit 22. The digital signal I/O circuit 22 is connected through digital signals I/O cables 13 and 23 to the positioning jig 4 and the work tool 2 respectively.

Here, digital signals are input and output by a ladder execution unit 44 running a ladder program 45 on the memory 16. Note that, the digital signals may also be input and output by the work programs 19 and 20 directly using the digital signal I/O circuit 22. Further, the digital signals may also be input and output between the machine tools 5 and 6 through the network interface 21 and network cable 9 by the ladder program 45 run by the ladder execution unit 44 or by the work programs 19 and 20.

The PC 8 shown in FIG. 2 is provided with a hard disk device 24 storing setting files 25, 26, 27 and 28. Further, the storage device 17 of the robot controller 7 shown in FIG. 3 stores setting files 36, 37, 38, and 39 having the same contents as the setting files 25, 26, 27 and 28 inside the hard disk device 24 of the PC 8.

Further, as shown in FIG. 2, an operation panel interface 29 of the robot controller 7 is connected through an operation panel cable 30 to a teaching operation panel 31. As shown in FIG. 2, the teaching operation panel 31 is provided with a display 31a and input buttons 31b. Workers can operate the robot controller 7 using the teaching operation panel 31.

Further, as shown in FIG. 3, the robot controller 7 is provided with an ID storage memory 46. The ID storage memory 46 stores ID's 50. Each ID 50 is made up of a part number 47, machine number 48, and user number 49. The machine number 48 may be a number identifying the type of robot 1, may be a number identifying the type of robot controller 7, may be a number identifying the type of rail axis 3, or may be a combination of numbers identifying the types of robot 1, robot controller 7, and rail axis 3.

The part number 47 is a serial number uniquely assigned to indicate an individual robot 1. The part number 47 may be a number assigned for each individual robot 1, may be a number assigned for each individual controller 7, may be a number assigned for each individual rail axis 3, or may be a combination of these serial numbers.

The user number 49 is a number identifying the end user to which the robot 1, robot controller 7, or rail axis 3 is delivered. There are also cases when these are shipped from a manufacturer through a trading company or system house once and then reach the end user, so the user number 49 may be a number identifying the trading company or system house or may be a number comprised of numbers identifying the trading company, system house, and end user. An ID 50 may further be given numbers other than part number 47, machine number 48, and user number 49 depending on necessity. Further, not all of these necessarily need be provided.

As can be seen from FIG. 2, the machine tools 5 and 6 are provided with CNC controllers 40 and 41 respectively. While not shown in the figure, these CNC controllers 40 and 41 also are configured similar to the robot controller 7. In other words, each of the CNC controllers 40 and 41 is provided with a CPU 14, operation panel interface 29, servo interface 32, memory 16, ladder execution unit 44, digital signal I/O circuit 22, network interface 21, storage device 17, bus 15, ID storage memory 46, ID's 50, and the like similar to the above. However, the CNC controllers 40 and 41 are provided with operation panels 42 and 43 respectively which replace the teaching operation panel 31.

The ID storage memory 46 shown in FIG. 3 stores ID's 50 relating to the CNC controller. Each ID 50 is made up of a part number 47, machine number 48, and user number 49. The machine number 48 may be a number identifying the type of machine tool 5 or 6, further, may be a number identifying the type of the CNC controllers 40 or 41, or may be a combination of numbers identifying the types of each.

The part number 47 is a serial number uniquely assigned to indicate the machine tool 5 or 6 individually. The part number 47 may be assigned to each individual machine tool 5 or 6, may be assigned to each individual CNC controller 40 or 41, or may be a combination of serial numbers for each.

The user number 49 is a number identifying the end user that the machine tool 5 or 6 or CNC controller 40 or 41 is delivered to. The user number 49 may be a number identifying the machine tool manufacturer, a number identifying the end user of the machine tool, or a combination of these user numbers. Further, depending on necessity, an ID 50 may further be given numbers other than the part number 47, machine number 48, and user number 49. Further not all of these necessarily need be provided.

The storage device 17 shown in FIG. 3 may specifically be a hard disk device, memory card, USB memory, or other such non-volatile secondary storage device, may be a battery backed up non-volatile memory, or may be a volatile memory such as a simple DRAM memory. When the storage device 17 is a volatile memory, the storage device 17 may obtain a setting file from the hard disk device 24 of the PC 8 through the network cable 12 and network interface 21 before or each time it refers to a setting file.

The storage memory 46 for storing the ID's 50 may be configured as a memory separate from the memory 16, or the ID's 50 may be stored in the storage device 17 and read into the memory 16 from the storage device 17 as necessary.

The part number 47 and machine number 48 of each ID 50 are input using an input screen from the teaching operation panel 31 and operation panel 42 and recorded in the ID storage memory 46 when a robot or a machine tool is sent from a manufacturer. The part number 47 is a unique number assigned to each robot and machine tool and is managed by the production control system of the manufacturer.

The user number 49, after shipping of the product, is input by the system house, end user, machine tool manufacturer, or the like using an input screen from the teaching operation panel 31 and operation panel 42 and recorded in the ID storage memory 46. The user number 49 is an eight digit number. Because a unique number is assigned to the system house, end user, machine tool manufacturer, and the like, assignment is managed by a specific organization. If necessary, one can send a request to the managing organization in advance for assignment of a user number.

Figure 4:
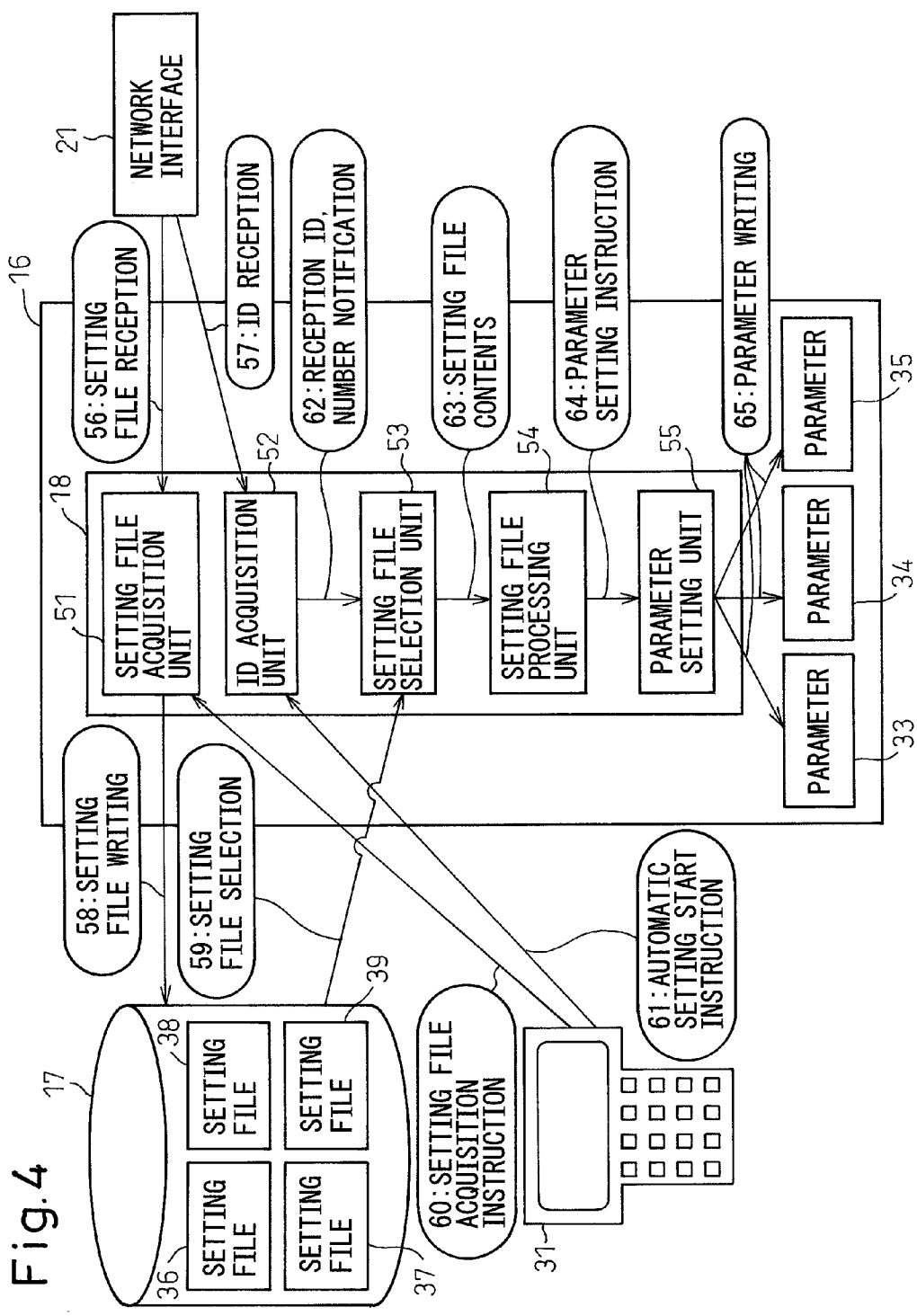
FIG. 4 is a view explaining the automatic setting of parameters stored in a memory.

In the present invention, the setting files 36, 37, 38, and 39 stored in the storage device 17 are used to automatically set the parameters 33, 34, and 35 stored in the memory 16. FIG. 4 is a view explaining the automatic setting of the parameters stored in the memory 16. As shown in FIG. 4, the control program 18 includes a setting file acquisition unit 51, ID acquisition unit 52, setting file selection unit 53, setting file processing unit 54, and parameter setting unit 55.

As can be seen from an explanation given later, the ID acquisition unit 52 performs the role of detecting a type and number of machine tools and/or robots. Further, the parameter setting unit 55 performs the role of setting the robot controller based on a type and number of machine tools and/or robots.

Further, FIG. 5 is a view showing a flowchart explaining a procedure for preparation of a setting file. Below, the procedure for preparation of a setting file will be explained with reference to FIG. 4 and FIG. 5. First, at step 101 of FIG. 5, a worker uses the PC 8 to create setting files 25, 26, 27, and 28 in advance on the hard disk device 24. These four setting files 25, 26, 27, and 28 are made differently from each other corresponding to the combination of the type and number of machine tools that the robot 1 loads and unloads with.

In one embodiment, setting files 25 to 28 are created for use in the following cases:

Setting file 25: Case where there is one type A machine tool

Setting file 26: Case where there are two type A machine tools

Setting file 27: Case where there is one type B machine tool

Setting file 28: Case where there are two type B machine tools

When creation of such setting files 25 to 28 is complete, the robot controller 7 and PC 8 are connected with the network cable 12. Further, the setting files 25, 26, 27, and 28 of the hard disk device 24 of the PC 8 are transferred through the network cable 12 to the storage device 17.

Then, at step 102, the worker uses the teaching operation panel 31 to issue an acquisition instruction 60 for a setting file to the setting file acquisition unit 51. Then, the setting file acquisition unit 51 reads an ID 50 from the ID storage memory 46 and sends the ID 50 through the network interface 21 to the PC 8 (step 103).

Then, the PC 8 searches for the setting files that relate to the ID 50 inside the hard disk device 24 (step 104). After that, it sends only the setting files created for the controller for which the setting file acquisition request was made through the network cable 12 (step 105). Thereby, at step 106, the setting file acquisition unit 51 receives the setting files 25 to 28 for which the acquisition request was made.

Finally, the setting file acquisition unit 51 writes the acquired setting files as the setting files 36, 37, 38, and 39 into the storage device 17 (step 107). Therefore, the setting file 25 and 36, 26 and 37, 27 and 38, and 28 and 39 have the same contents. Note that, in such a case, it will be understood that the writing of unnecessary setting files into the storage device 17 is prevented.

The automatic setting of the robot based on the present invention begins after the robot 1, rail axis 3, robot controller 7, temporary loading platform 4, and machine tools 5 and 6 are installed at the workplace and connected to each other by the cables 10 and 11, digital signal I/O cables 13 and 23, and network cable 9.

Figure 6A:
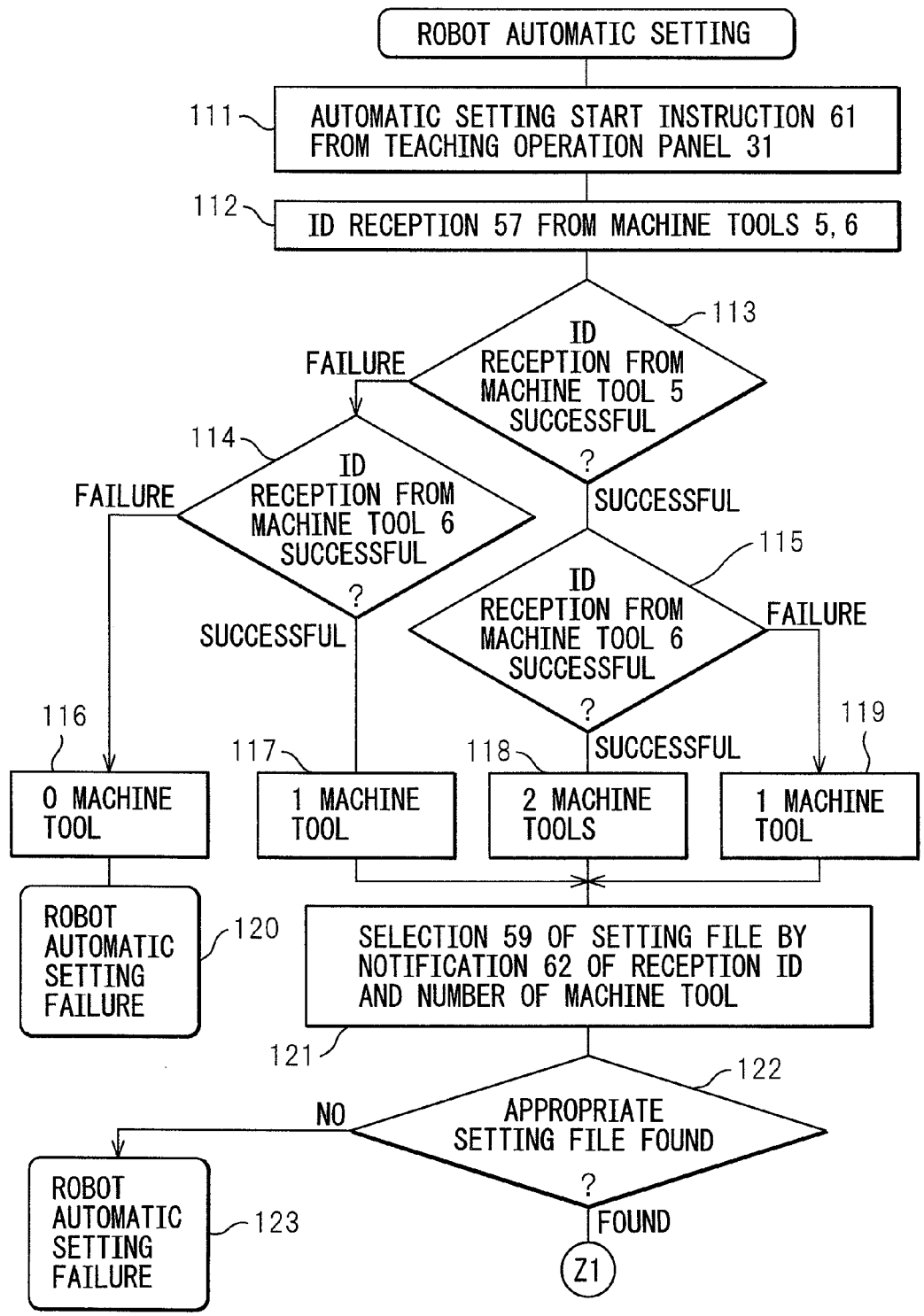
FIG. 6A is a first view showing a flowchart explaining an automatic setting procedure for a robot based on an embodiment.

FIG. 6A and FIG. 6A are views showing a flowchart explaining an automatic setting procedure for a robot based on one embodiment. At step 111 of this flowchart, a worker uses the teaching operation panel 31 to issue an automatic setting start instruction 61 to the ID acquisition unit 52.

Further, at step 112, the ID acquisition unit 52 acquires through the network interface 21 and network cable 9 an ID 50 that is stored in the ID storage memory 46 of the CNC controller 40 of the machine tool 5 and an ID 50 that is stored in the ID storage memory 46 of the CNC controller 41 of the machine tool 6. Here, the ID of the CNC controller 40 is represented as ID 50a, and the ID of the CNC controller 41 as ID 50b.

When the machine tool 5 is not connected to the network cable 9 at time of acquisition of the ID 50, when the CNC controller 40 is not powered up even if connected, or when the CNC controller 40 does not have an ID 50, the ID 50a cannot be acquired. For similar reasons, there are also cases when the ID 50b cannot be acquired from the machine tool 6.

The ID acquisition unit 52 carries out ID reception 57 of IDs 50a and 50b and sends a notification 62 of the received IDs 50a and 50b to the setting file selection unit 53. The setting file selection unit 53 judges the types of the machine tools 5 and 6 based on the machine numbers 48 of the IDs 50a and 50b and performs selection 59 of one setting file from the setting files 36, 37, 38, and 39 stored in the storage device 17.

In other words, when there is ID reception 57 of only one of the IDs 50a and 50b and the machine number 48 of the ID is A, the setting file 36 is selected (steps 113, 115, 119, and 121), while when the machine number of the ID is B, the setting file 38 is selected (steps 113, 114, 117, and 121).

Further, when there is ID reception 57 of both IDs 50a and 50b, and the machine numbers 48 of the IDs are both A, the setting file 37 is selected, while when the machine numbers 48 of the IDs are both B, the setting file 39 is selected (steps 113, 115, 118, and 121).

Note that, when neither of the IDs 50a and 50b are received (step 113, 114, and 116) or when one machine number 48 is A and the other is B, the storage device 17 has no setting file created to be used in this case (step 122) so automatic setting fails and stops (step 120, 123).

Then, at step 124, a notification 63 is sent to the setting file processing unit 54 concerning the content of the setting file that corresponds to the ID that the setting file selection unit 53 received. Various parameters and their corresponding settings are listed in one setting file, so the setting file processing unit 54 analyzes the contents of the setting file and extracts the parameters and values to be set by the setting file.

Further, the setting file processing unit 54 sends a parameter setting instruction 64 based on the extracted results to the parameter setting unit 55 (step 125). Then, the parameter setting unit 55 performs parameter writing 65 to the parameters 33, 34, and 35 based on the parameter setting instruction 64 (step 126), whereupon the automatic setting is completed.

Here, the parameters 33, 34, and 35 include various settings for the robot controller 7. In the present embodiment, the parameter 33 is an interlock signal assignment setting, the parameter 34 is a setting of the coordinate system for defining the loading and unloading operation of the robot, and parameter 35 is a setting of the work program run for the part number. Needless to say, there are also cases of other parameters being stored in the memory 16 of the robot controller 7.

After setting the parameters 33, 34, and 35 in the robot controller 7, the machine tools 5 and 6 are automatically set to correspond to these parameters 33, 34, and 35. There are several methods for setting the machine tools 5 and 6.

One method of setting the machine tools 5 and 6 is similar to the method of setting the robot controller 7. In this case, the machine tool 5 acquires IDs from the machine tool 6 and the robot controller 7. A setting file for each ID combination is created by the PC 8 and is transferred in advance to the storage device 17 of the machine tool 5. Further, similar to the above, a setting file is selected based on the acquired IDs, the contents of the setting file are analyzed, the parameter setting contents are extracted, and parameter writing is performed. The method is generally the same for the machine tool 6.

In such a case, a plurality of setting files for use with the robot controller 7, a plurality of setting files for use with the machine tool 5, and a plurality of setting files for use with the machine tool 6 must be created by the PC 8 and stored in advance in the storage device 17.

Further, in such a case, it is necessary to prevent contradictions in the contents of the setting files stored in the storage devices 17 of the robot controller 7 and machine tools 5 and 6. For example, when updating only the setting files of the storage device 17 of the robot controller 7 and not updating the setting files of the storage devices 17 of the machine tools 5 and 6, there may be contradictions between the robot controller 7 and machine tools 5 and 6 in the contents that are set by the automatic setting.

To deal with this, when creating a setting file by the PC 8, a single setting file is made to include the parameter setting contents of the robot controller 7 and the parameter setting contents of the machine tools 5 and 6. Alternatively, the parameter setting contents of the robot controller 7 and the parameter setting contents of the machine tools 5 and 6 can be separately created, then these parameters linked to create a single setting file. Due to this, the setting file created by the PC 8 includes both of a setting portion used by the robot controller 7 and a setting portion used by the machine tools 5 and 6.

In such a case, at time of setting file selection 59 (step 121), in addition to the IDs acquired by ID reception 57, the ID 50 inside the corresponding ID storage memory 46 is used to select the setting file.

Figure 6B:
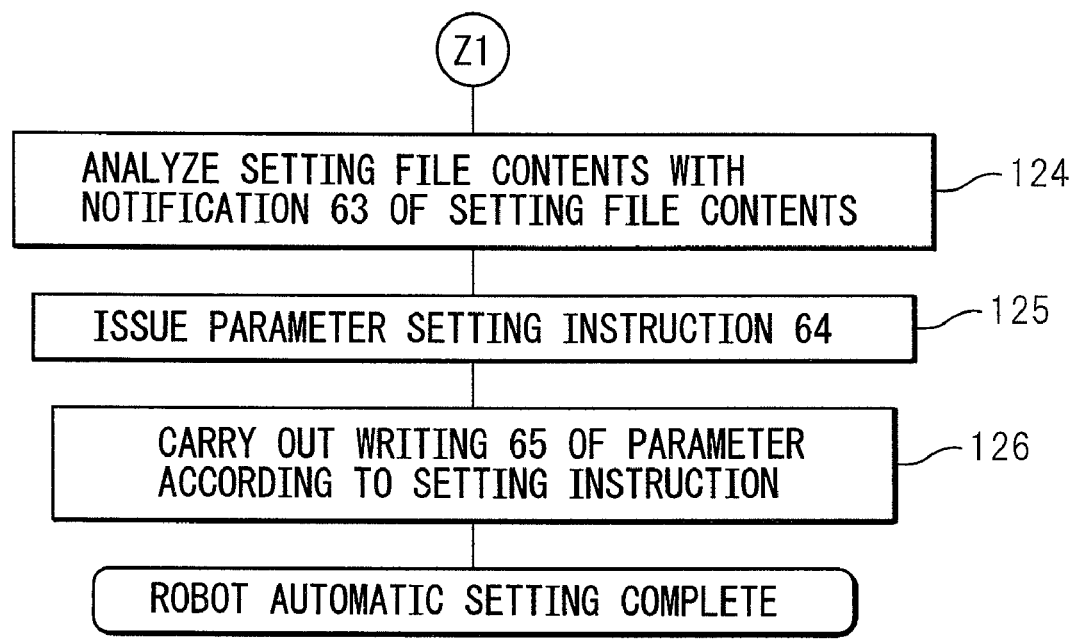
FIG. 6B is a second view showing a flowchart explaining an automatic setting procedure for a robot based on an embodiment.

However, in such a case, the robot controller 7 and machine tools 5 and 6 execute identical processing, so the system as a whole can become complicated. FIG. 7 is a second view showing a flowchart explaining an automatic setting procedure for a robot based on another embodiment. FIG. 7 corresponds to FIG. 6B. The processing before step 124 in FIG. 7 is the same as in FIG. 6A, so the explanation is omitted.

As shown at step 124a of FIG. 7, it is judged if the setting file relates to the contents of any of the robot controller 7 and machine tools 5 and 6. Further, on the basis of the contents of the setting file, the setting file is sent to the robot controller 7 or the machine tool 5 or 6 (step 131 to 134).

In other words, in the embodiment shown in FIG. 7, only one of the devices out of the robot controller 7 and machine tools 5 and 6 stores setting files in the storage device 17 and selects a setting file using the ID's (59). Further, the remaining devices from among the robot controller 7 and machine tools 5 and 6 acquire only the contents 63 of the setting file that the setting file selection unit 53 selected through the network interface 21. Further, the remaining devices process the acquired setting file contents with the setting file processing unit 54 of the same device and carry out parameter writing 65.

In such a case, it is possible to eliminate the storage devices 17 of the remaining devices among the robot controller 7 and machine tools 5 and 6. Further, the processing before the setting file processing unit 54 does not have to be carried out. Further, it is sufficient for the setting file acquisition instruction 60 and automatic setting start instruction 61 from the teaching operation panel 31 or operation panels 42 and 43 to be carried by just one of the robot controller 7 or machine tools 5 and 6. Due to this, all operations automatically run by the controller are completed.

Figure 8:
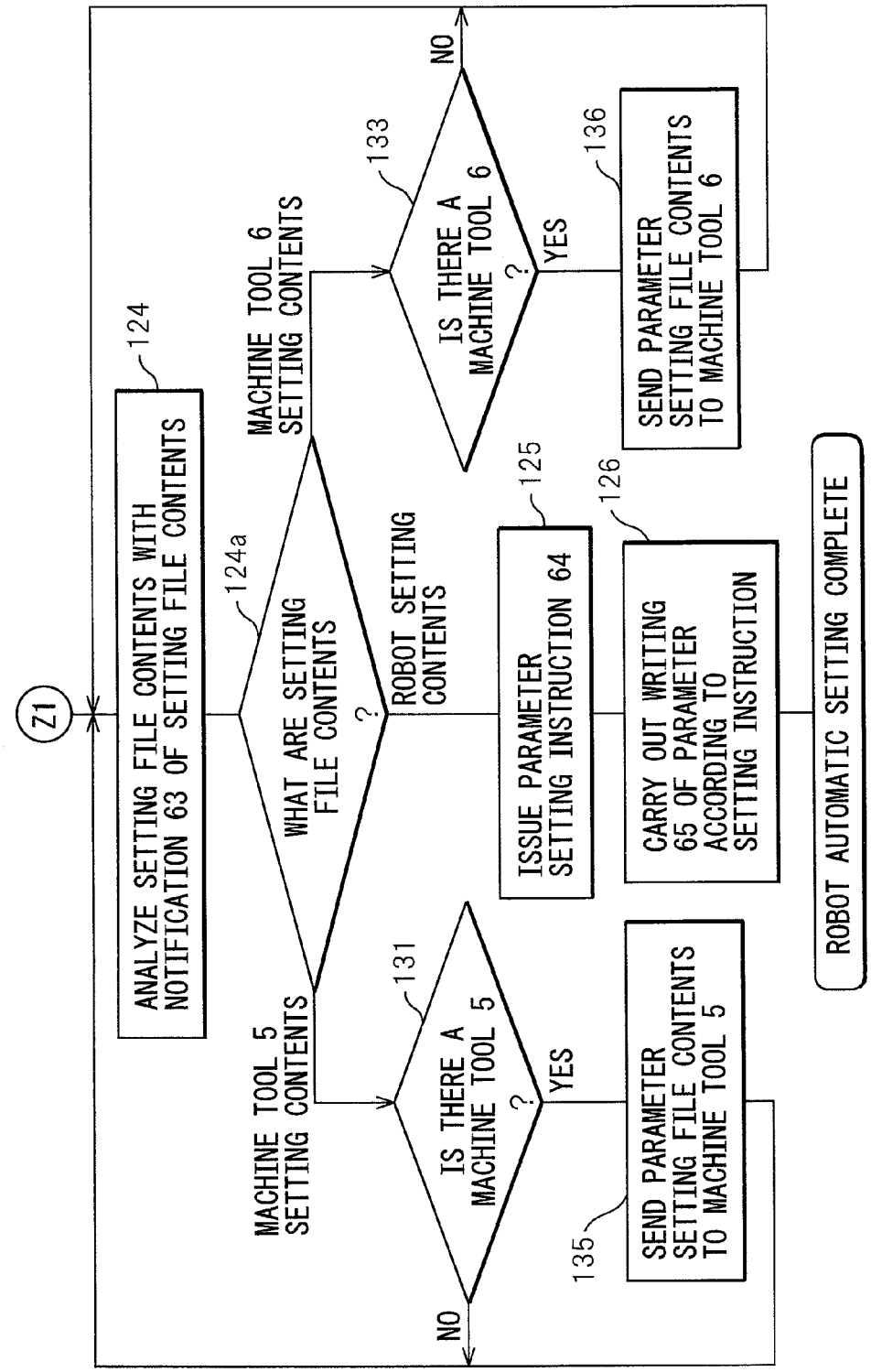
FIG. 8 is a second view showing a flowchart explaining an automatic setting procedure for a robot based on still another embodiment.
Figure 9:
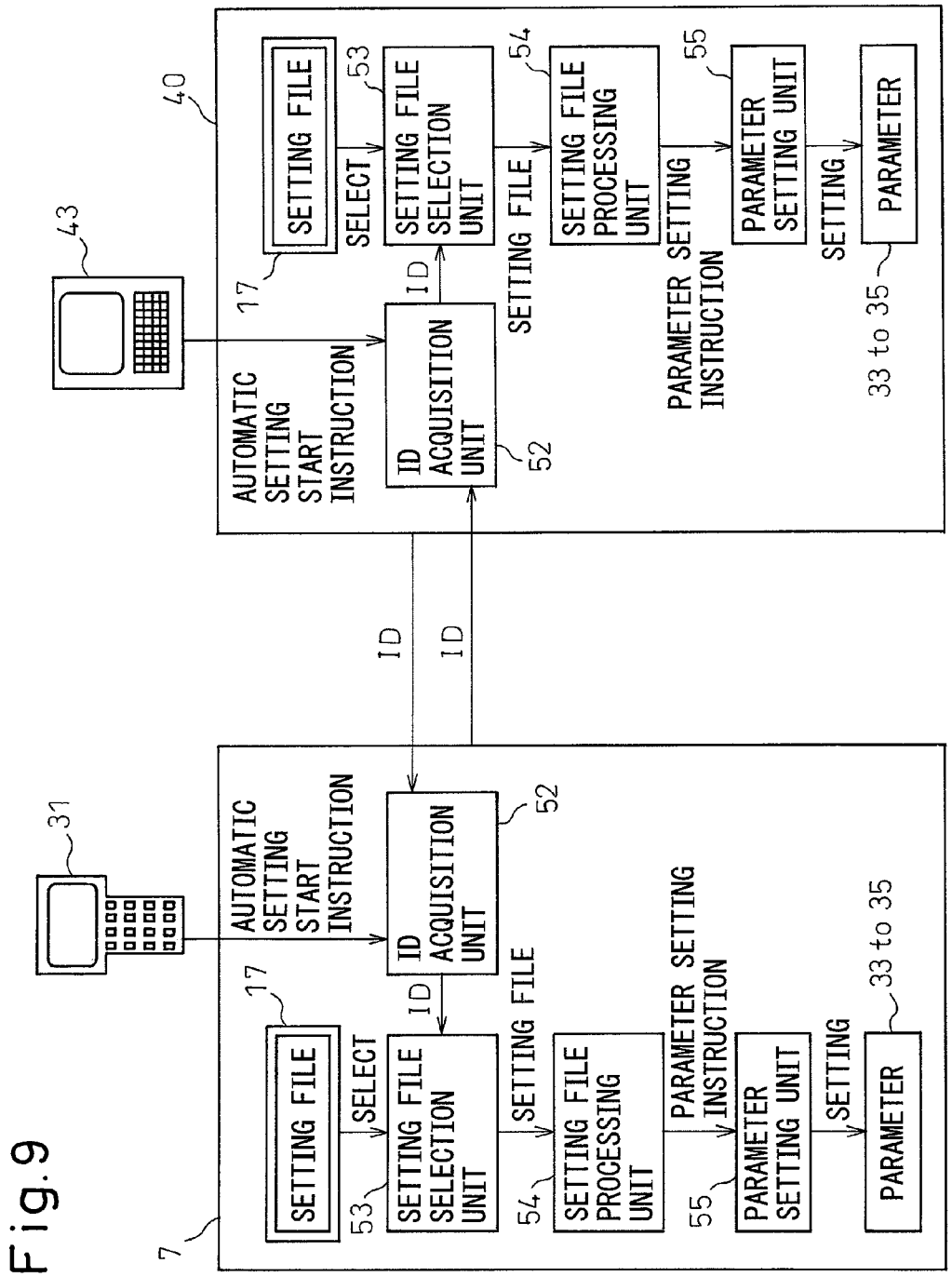
FIG. 9 is a view showing a first combination of a robot controller provided with the functions in FIG. 4 and a CNC controller.
Figure 10:
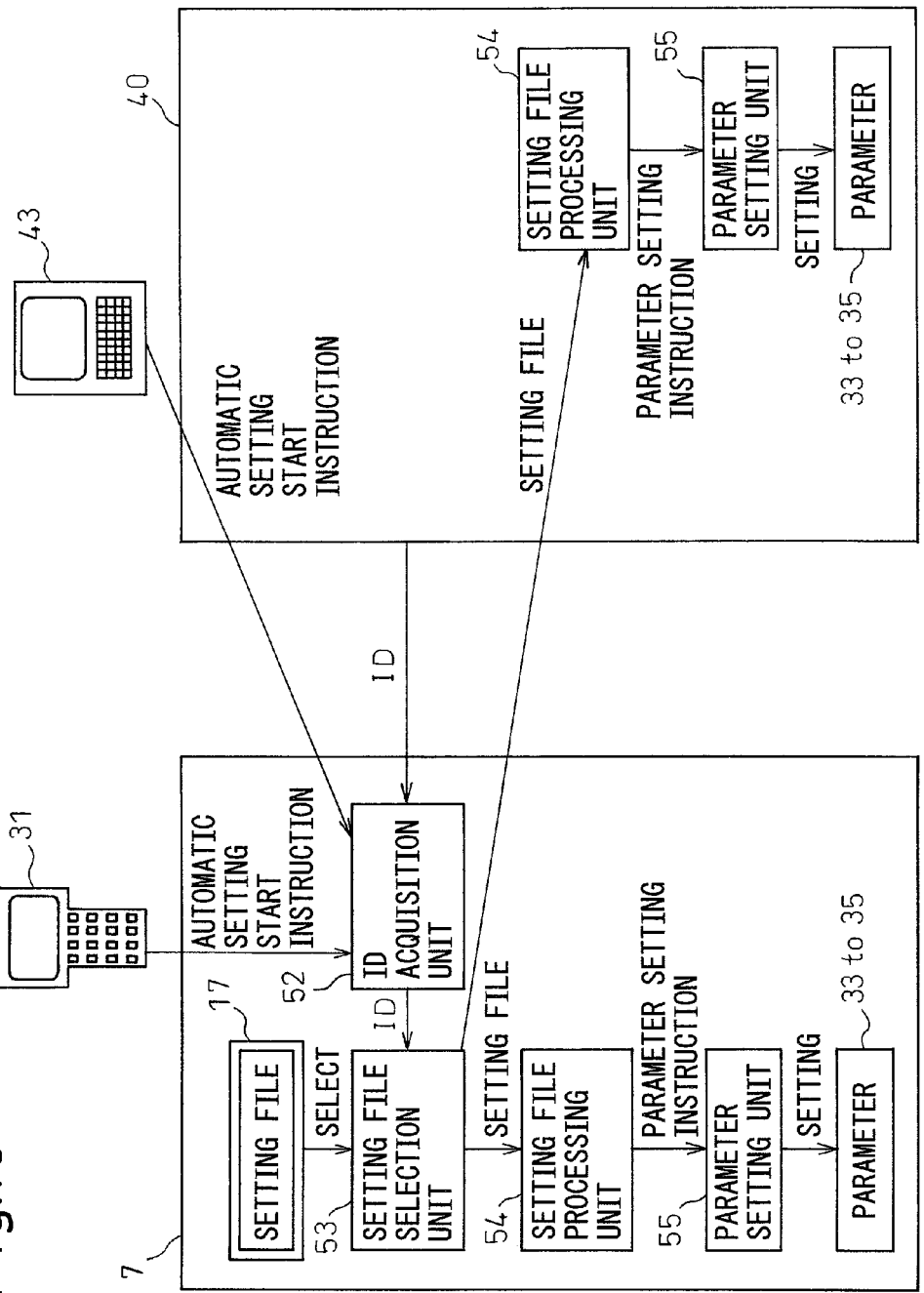
FIG. 10 is a view showing a second combination of a robot controller provided with the functions in FIG. 4 and a CNC controller.
Figure 11:
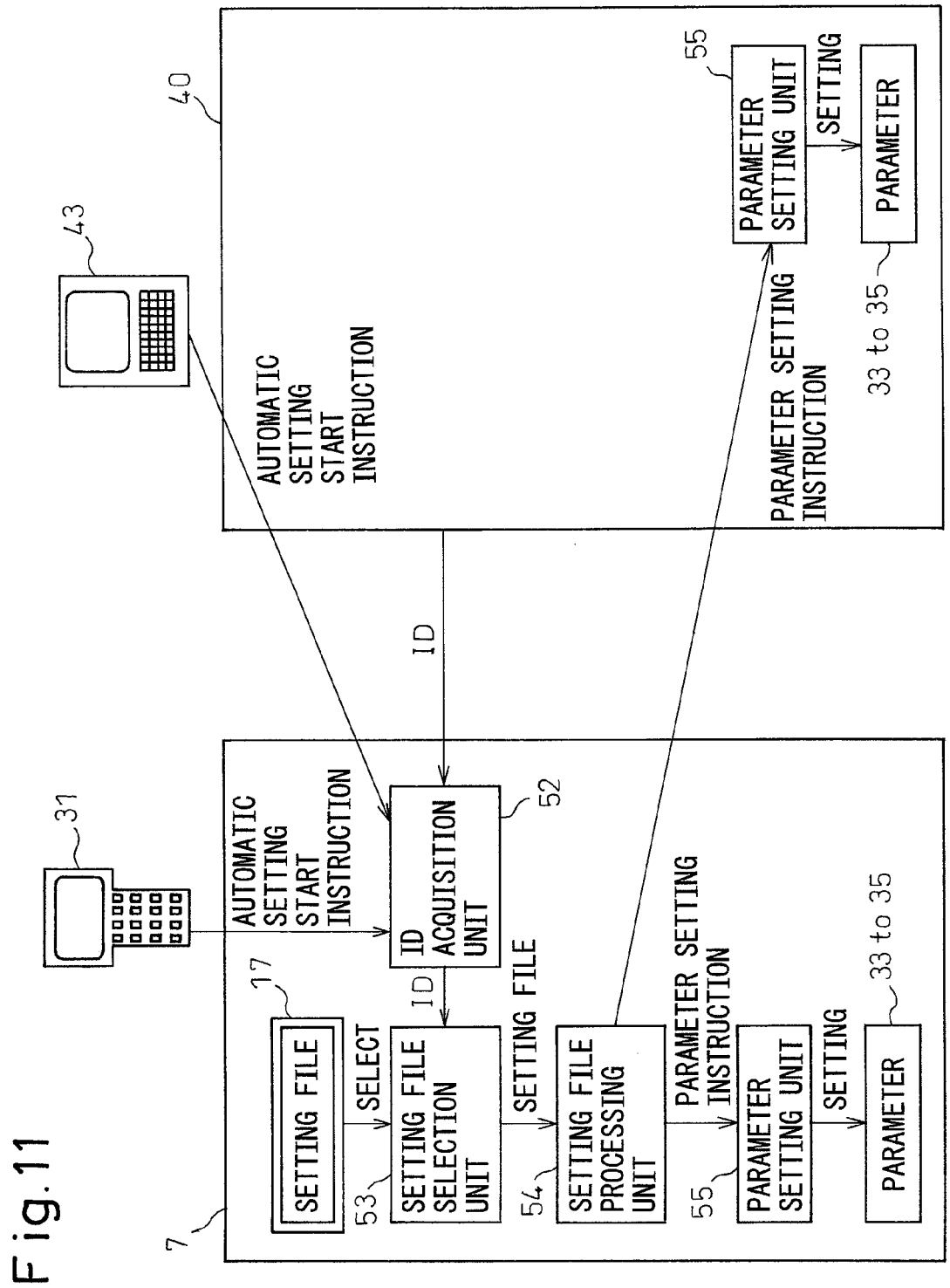
FIG. 11 is a view showing a third combination of a robot controller provided with the functions in FIG. 4 and a CNC controller.

Further, FIG. 8 is a view similar to FIG. 7 showing a flowchart explaining an automatic setting procedure for a robot based on another embodiment. As can be seen from steps 135 and 136 of FIG. 8, when the setting file processing unit 54 of one device out of the robot controller 7 and machine tools 5 and 6 is analyzing the contents of a setting file, not only are the parameters written in that one device, but also parameter setting instructions 64 are created for the remaining devices of the robot controller 7 and machine tools 5 and 6. Further, this setting instruction 64 is notified through the network interface 21 to the parameter setting unit 55 of the remaining devices, where parameter writing 65 is carried out in the remaining devices.

In the embodiment shown in FIG. 8, it is sufficient for only one of the robot controller 7 and machine tools 5 and 6 to store setting files in the storage device 17, select (59) a setting file using the ID's, and process the contents of the setting file. The other devices need only perform processing after the parameter setting unit 55.

Further, while not shown in the drawings, the storage device 17 of the robot controller 7 does not have to be provided with setting files. In its place, it is possible to use setting files transferred to the storage devices 17 of the CNC controllers 40 and 41 of the machine tools 5 and 6 to automatically set the robot controller 7. In such a case, this is equivalent to the processing shown in FIG. 4 being run at the CNC controllers 40 and 41.

In other words, the setting file acquisition instruction 60 and the automatic setting start instruction 61 are input from the operation panels 42 and 43, a setting file is selected by the setting file selection unit 53, and the selected setting file is sent to the robot controller 7 using the network cable 9. Alternatively, in each of the CNC controllers 40 and 41, the processes up to creation of the parameter setting instruction 64 may be carried out by the setting file processing unit 54, and the setting instruction transferred through the network cable 9 to the robot controller 7.

FIG. 9 to FIG. 13 are views showing combinations of a robot controller provided with the functions in FIG. 4 and a CNC controller. As shown in each of FIG. 9 to FIG. 13, the functions 52 to 55 shown in FIG. 4 may be provided by any of the robot controller 7 and CNC controllers 40 and 41. As can be seen from FIG. 9 to FIG. 13, various configurations can be employed for providing the functions 52 to 55. Note that, in FIG. 9 to FIG. 13, a worker may issue an automatic setting start instruction from any of the teaching operation panel 31 connected to the robot controller 7 or the operation panels 42 and 43 of the machine tools 5 and 6.

Figure 12:
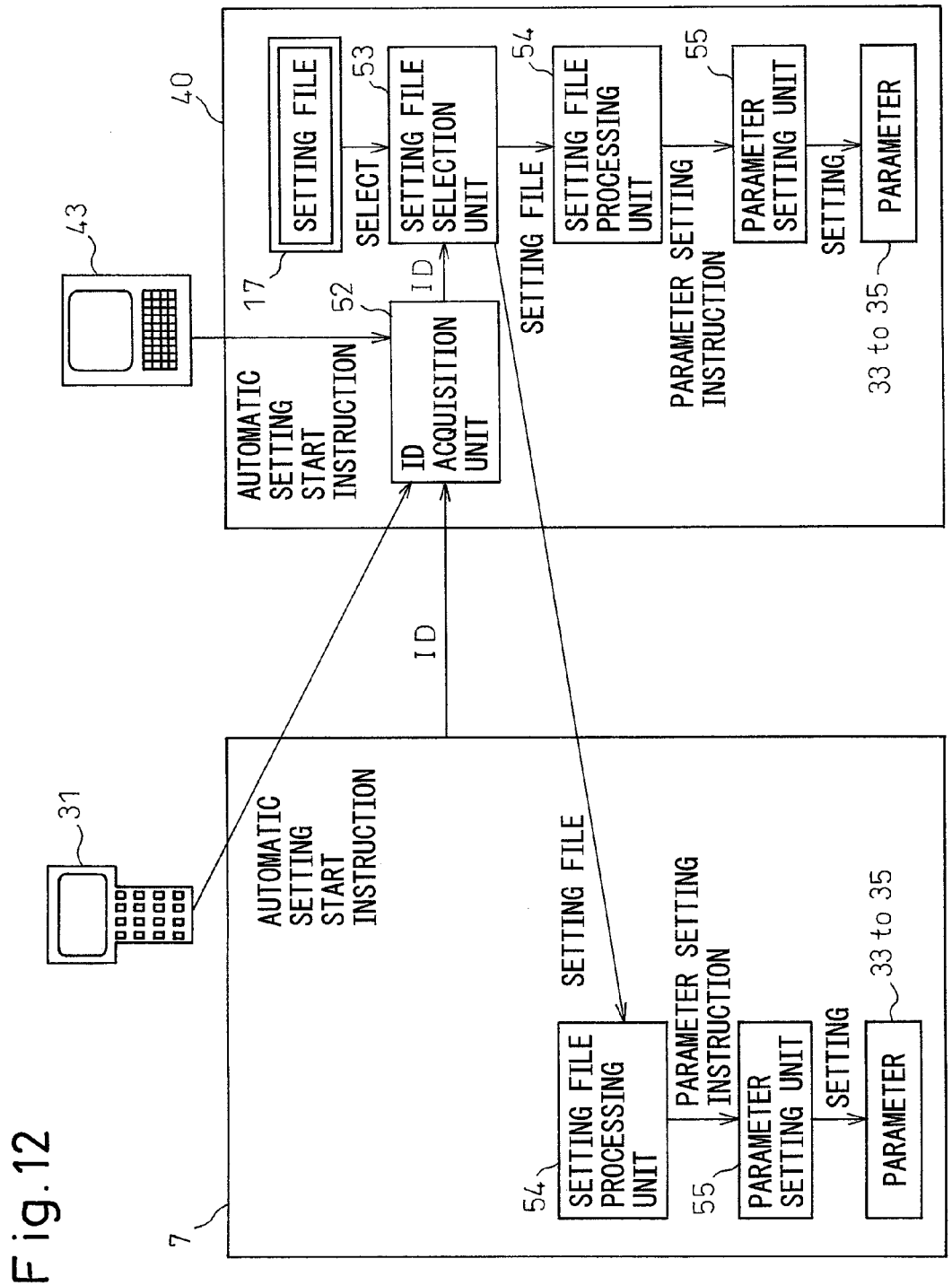
FIG. 12 is a view showing a fourth combination of a robot controller provided with the functions in FIG. 4 and a CNC controller.
Figure 13:
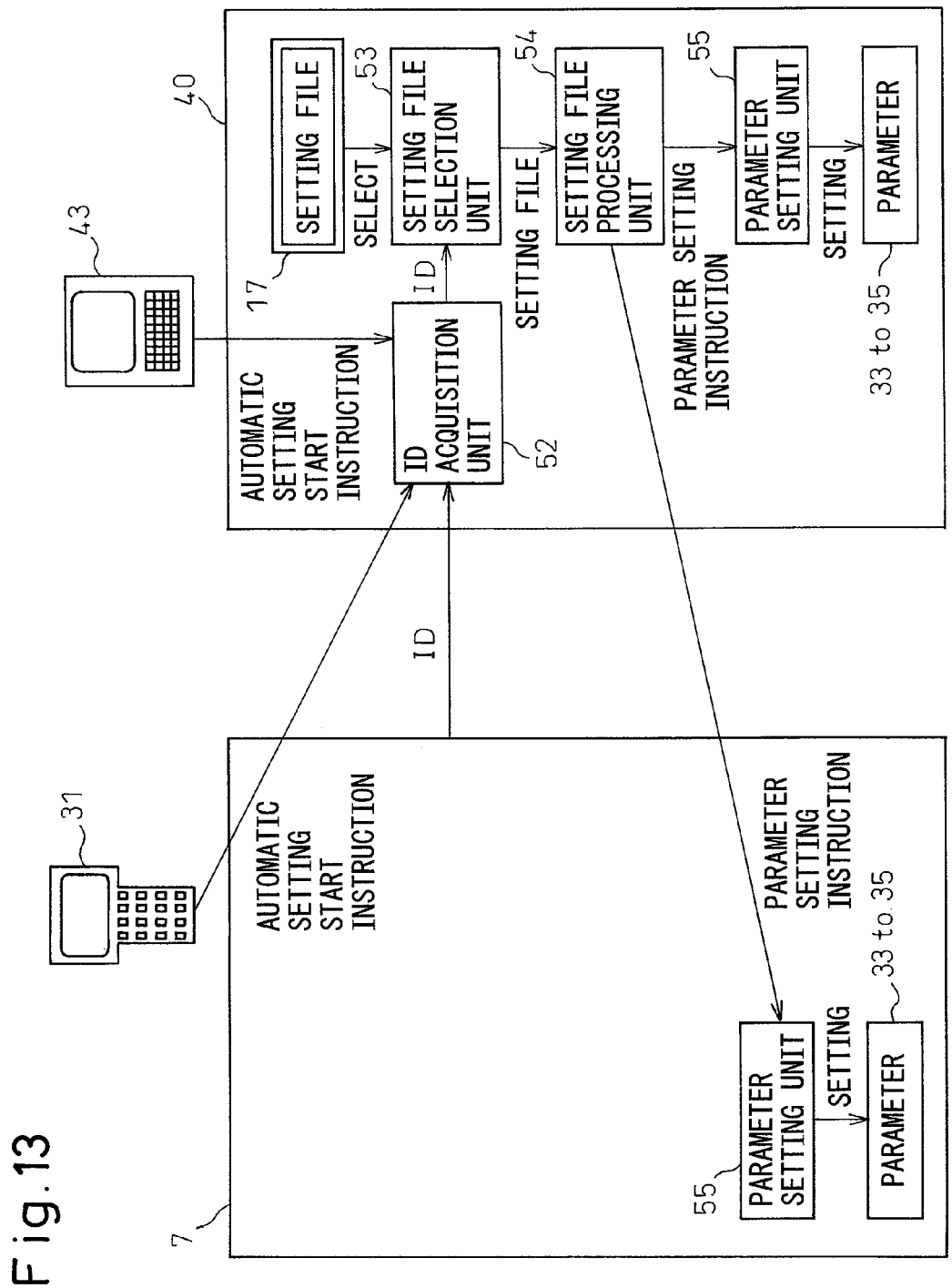
FIG. 13 is a view showing a fifth combination of a robot controller provided with the functions in FIG. 4 and a CNC controller.

In particular, in FIG. 12 and FIG. 13, the type and number of robots are sent to the CNC controller 40 of the machine tool 5 from the robot controller 7. Further, as can be seen from these drawings, a setting file or parameter setting instruction used in setting the robot controller 7 is created in the CNC controller 40. Then, the setting file or parameter setting instruction is sent from the CNC controller 40 to the robot controller 7. Due to this, the robot controller 7 is set.

Figure 14:
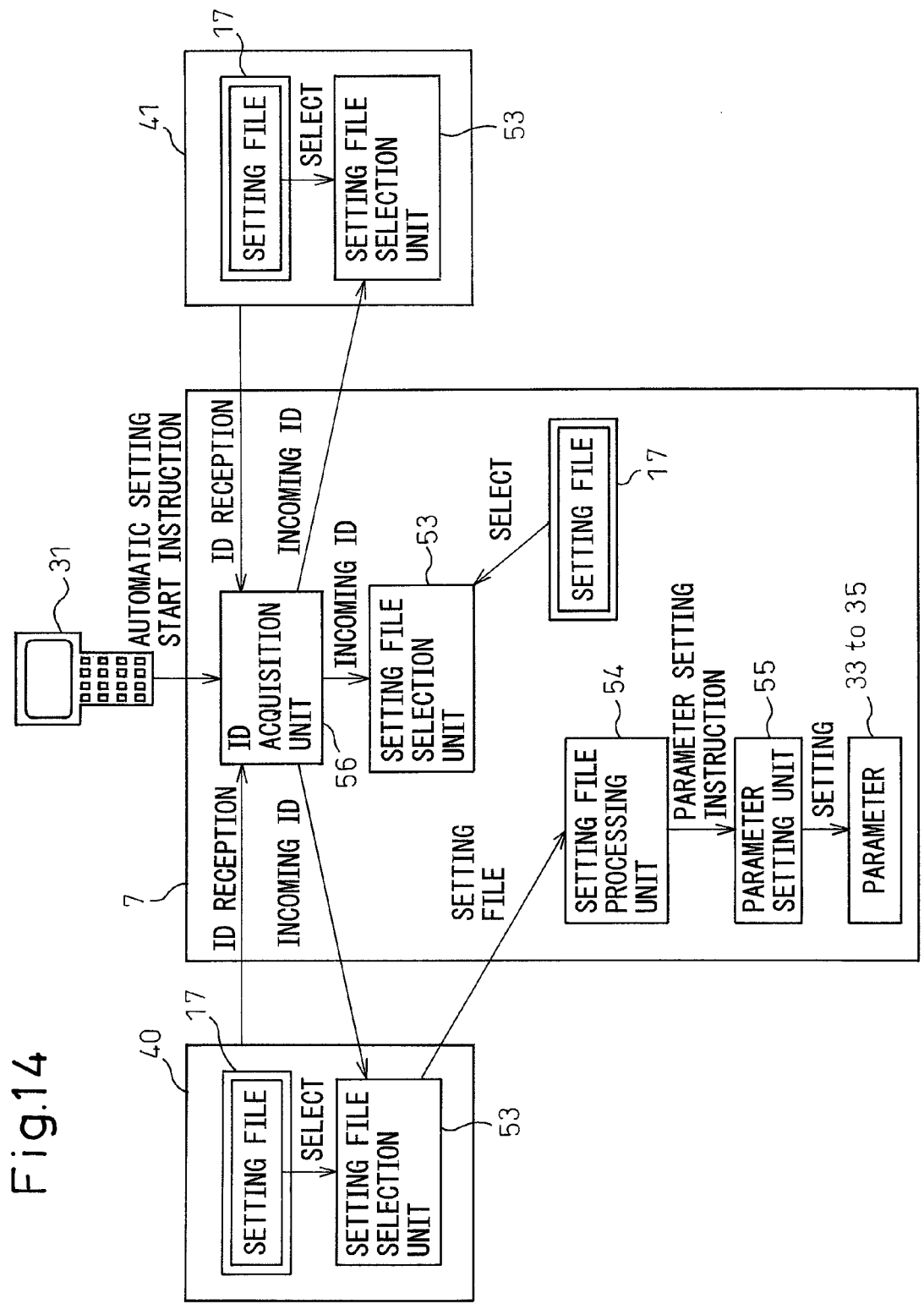
FIG. 14 is a view showing a combination of a robot controller and a CNC controller based on another embodiment.

Further, FIG. 14 is a view showing a combination of a robot controller and a CNC controller based on another embodiment. In FIG. 14, the robot controller 7 receives the ID's of the CNC controllers 40 and 41 (including the numbers) by the ID acquisition unit 52, then transfers the received IDs to the setting file selection units 53 of the CNC controller 40, CNC controller 41, and robot controller 7 using the network cable 9.

Further, a setting file that matches the transmitted ID's is searched for in the storage device 17 of each device. When there is such a setting file, the setting file is transferred to the robot controller 7, where the setting file processing unit 54 and parameter setting unit 55 are used to set the parameters. In such a case, the setting file may be in any device on the network. Based on the ID's, an appropriate setting file can be automatically searched for from a storage device 17 in the devices in the network and used. Note that, while not shown in the drawing, it is possible to send the ID's to the setting file selection units 53 of the CNC controllers 40 of the machine tools 5 and 6 to select the setting file.

In this regard, at the time of ID reception 57, when ID's with the same machine numbers 48 are returned from a plurality of controllers, the ID acquisition unit 52 can set the controllers differently in accordance with the network addresses of the sources of the ID's even when there are a plurality of controllers with the same machine numbers on the network.

Generally, as a network, TCP/IP is often used on the Ethernet™. In such a case, each node in the network has a unique 32 bit length IP address. When data is being sent to the network, the destination is designated by an IP address. Further, when data is being received from the network, it is possible to identify which node the data is from by acquiring the IP address of the transmission source. Further, in the Ethernet™, data can be sent simultaneously to all the nodes in a network or a specific plurality of nodes by broadcast or multicast without designating destination IP addresses.

By using these characteristics, ID queries can be sent to unidentified nodes. Further, the number of controllers on the network can be determined according to the number of ID's returned with respect to a query. Further, the type and number of machines on the network can be determined according to the returned ID's.

Further, a node sending ID queries receives ID's in response in a fixed amount of time. When there is an ID query, each node must respond with an ID within the fixed amount of time. A node sending ID queries therefore ignores IDs returned after the fixed amount of time.

For example, when one machine tool becomes difficult to operate due to malfunctions or maintenance, the machine tool is separated from the production system and just the other machine tools are used to continue production. In such a case, switches for separating the machine tools from the production system are provided on the operation panels 42 and 43. When a separation switch is in the interlock mode, the ID is immediately returned in response to an ID query. On the contrary, when a separation switch is in the disconnect mode, the ID is not returned in response to the ID query. Due to this, a machine tool can easily be disconnected from the production system.

When the configuration of devices in a production system are changed in such a way, in the past it had been necessary to reset the machine tools and robots to match the configuration change. This required many man-hours. As opposed to this, in the present invention, a setting file is prepared for each system configuration. By just reissuing the automatic setting start instruction 61 from the teaching operation panel 31, resetting is carried out automatically. Therefore, in the present invention, it is possible to easily separate a device having running difficulties from the system.

For example, in the present embodiment, it is assumed that both machine tools 5 and 6 are of the machine type A. The setting file used when running with only the machine tool 5 is designated 25a, the setting file used when running only with the machine tool 6 is designated 25b, and the setting file used when running with the machine tools 5 and 6 is designated 26. In such a case, it is possible to appropriately use the setting files 25a, 25b, and 26 so as to match the settings of the separation switches of the machine tools 5 and 6.

Figure 15:
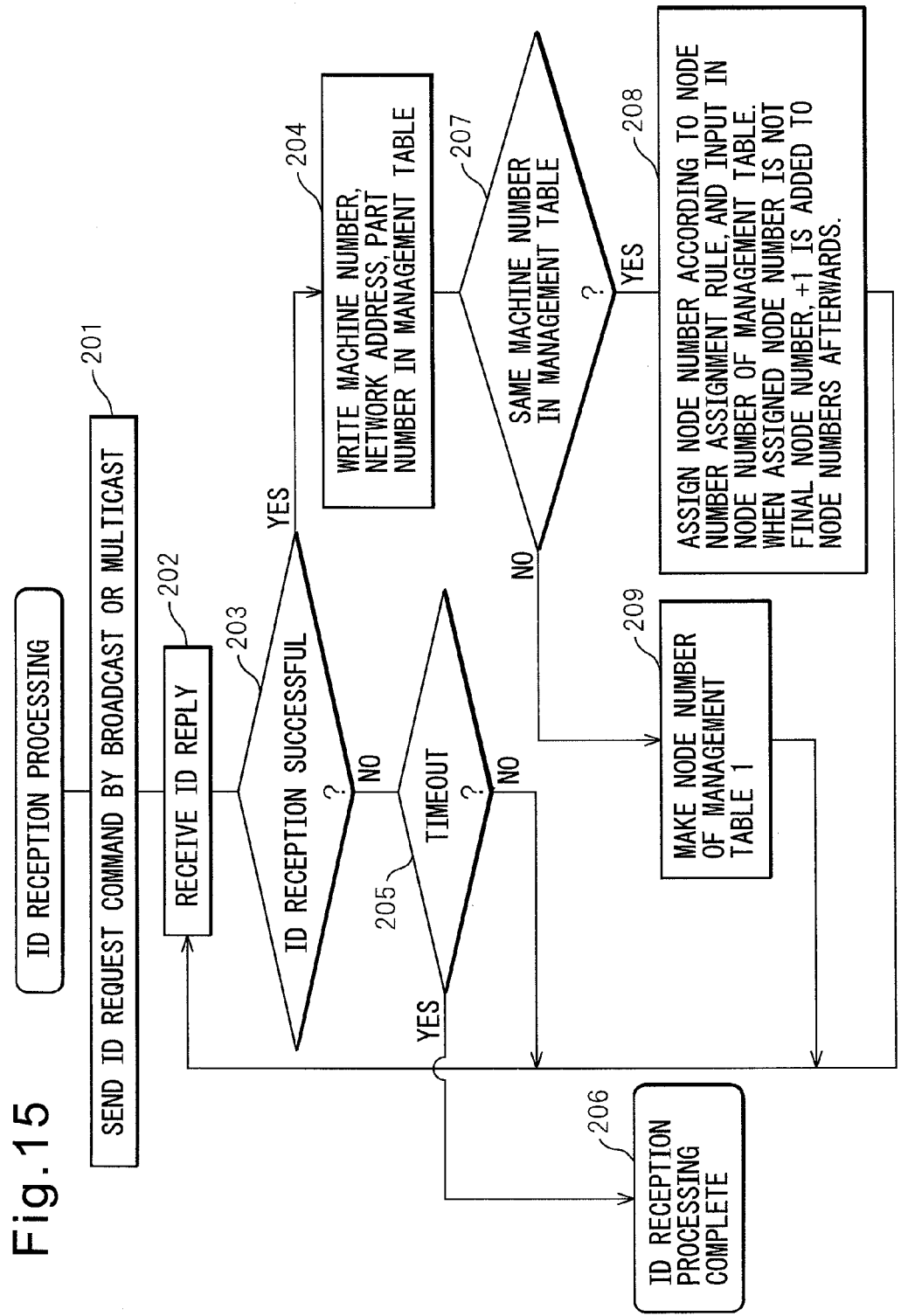
FIG. 15 is a view showing a flowchart explaining an ID reception procedure when there are a plurality of machine tools with the same machine number in a network.

FIG. 15 is a view showing a flowchart explaining the ID reception procedure when there are a plurality of machine tools with the same machine number in a network. Further, FIG. 16 is a view showing a received ID management table.

In the embodiment shown in FIG. 15 and FIG. 16, it is assumed that there are three machine tools having MODEL1016 as machine numbers in a network. At step 201 of FIG. 15, an ID request command is sent to all the nodes in the network by broadcast or multicast.

Further, an ID returned in response is received at step 202. At step 203, it is judged if reception was successful. If successful, the routine proceeds to step 204. At step 204, a new entry is added to the management table, and the machine number and part number contained in the received ID are input to the added entry. Further, the network address used in the ID response is also input.

Note that, when reception is not successful, the routine proceeds to step 205, where it is judged if the time has run out. If the time has run out, the routine proceeds to step 206, where it is judged that ID reception processing is complete.

Then, at step 207, it is checked whether there are entries having the same machine number in the management table. If there are no such entries, it can be judged that there are no nodes having the same machine number on the network. Accordingly, a node number 1 is input into the node number item of the management table (step 209).

As opposed to this, when there are entries having the same machine number in the management table, the routine proceeds to step 208, where a node number of the machine tool of the new entry in the table is assigned in accordance with a node number assignment rule. For example, a network address or part number that does not overlap between the machine tools may be used to determine the hierarchy between the nodes and thereby assign node numbers.

For example, if nodes 1 and 2 already exist in the management table, and the node number of a newly added entry is assigned as "1" according to the assignment rule, the node numbers in the management table are renumbered so that the node which had been the node 1 until now is changed to the node 2 and the node which had been the node 2 until now is changed to the node 3.

By changing the nodes in the management table in the above manner, even when there are a plurality of the same types of machine tools and/or a plurality of the same types of robots in a network, the node numbers can be uniquely assigned. That is, which machine tool and which robot are first and which machine tool and which robot are second are assigned.

As explained above, in FIG. 2 and FIG. 3, a plurality of setting files 25 to 28 and 36 to 39 are shown. Below, the specific contents of these setting files will be explained. The setting files are described in an XML format and are designed to be able to define various setting contents with respect to the robot controllers and machine tools by tags.

As described in this paragraph, in a setting file, a robot or machine tool ID is defined. This setting file is used only when a robot or machine tool matching the defined ID is found. For example, the robot ID is defined as in the following.

```
<RobotDef Name="Robot1" Node="1">
    <ID>
        <ProductNumber>
            <Robot Value="A05B-2500-H601"/>
            <Controller Value="A05B-2500-H510"/>
            <RailAxis Value="A05B-2500-H894"/>
        </ProductNumber>
        <SerialNumber>
        <Robot Value="R02206665"/>
            <Controller Value="E02103021"/>
            <RailAxis Value="R02806322"/>
        </SerialNumber>
        <Customer>
            <Integrator Value="00000110"/>
            <EndUser Value="00000005"/>
            <LineName Value="00000101"/>
            <CellName Value="00000102"/>
        </CustomerID>
    </ID>
</RobotDef>
```

In the above ID, the part number is defined by <SerialNumber>, the machine number by <ProductNumber>, and user number by <Customer>. In the above example, the part number, machine number, and user number of the robot mechanism are defined by <Robot>, the part number, machine number, and user number of the controller are defined by <Controller>, and the part number, machine number, and user number of the rail axis are defined by <RailAxis>. Further, in the above example, as the user numbers, the line number of the manufacturing facility using the robot is defined by <LineName>, and the cell number in the manufacturing facility line is defined by <CellName>.

Note that, for example, in cases when there is no request for ID matching with respect to the part numbers or user numbers, it is sufficient for these to be made Value="*" as below.

```
<RobotDef Name="Robot1" Node="1">
    <ID>
        <ProductNumber>
            <Robot Value="A05B-2500-H601"/>
            <Controller Value="A05B-2500-H510"/>
            <RailAxis Value="A05B-2500-H894"/>
        </ProductNumber>
        <SerialNumber>
        <Robot Value="*"/>
            <Controller Value="*"/>
            <RailAxis Value="*"/>
        </SerialNumber>
        <Customer>
            <Integrator Value="*"/>
            <EndUser Value="*"/>
            <LineName Value="*"/>
            <CellName Value="*"/>
        </CustomerID>
    </ID>
</RobotDef>
```

Further, the ID of the machine tool is defined as in the following.

```
<MachineDef Name="Machine1" Node="1">
    <ID>
        <ProductNumber>
            <Machine Value="MODEL1016"/>
            <Controller Value="A23B-2100-H110"/>
        </ProductNumber>
        <SerialNumber>
        <Machine Value="MA4311683"/>
            <Controller Value="E01104302"/>
        </SerialNumber>
        <Customer>
            <MachineBuilder Value="00000110"/>
            <EndUser Value="00000005"/>
        </CustomerID>
    </ID>
</MachineDef>
```

In the above example, as the user numbers, an ID for identifying an MTB (Machine Tool Builder) of a machine tool is represented by <MachineBuilder>, and an ID for identifying an end user of the machine tool is represented by <EndUser>. The user numbers may be freely defined in such a way by the user of the setting file in accordance with the operation configuration of the setting file. However, the user numbers are made eight digit numbers. In order to guarantee uniqueness, they must be managed by a specific organization. This organization allocates user numbers to users in advance. When there is a request, a plurality of user numbers may be assigned to the same user.

For example, when there are two machine tools of the same type and the machine of the node number 1 is named "Machine 1" and the machine of the node number 2 is named "Machine 2" by the node numbers assigned by the ID reception processing in FIG. 6A, the ID's are defined as follows.

```
<MachineDef Name="Machine1" Node="1">
    <ID>
        <ProductNumber>
            <Machine Value="MODEL1016"/>
            <Controller Value="A23B-2100-H110"/>
        </ProductNumber>
        <SerialNumber>
        <Machine Value="*"/>
            <Controller Value="*"/>
        </SerialNumber>
        <Customer>
            <MachineBuilder Value="00000110"/>
            <EndUser Value="00000005"/>
        </CustomerID>
    </ID>
</MachineDef>
<MachineDef Name="Machine2" Node="2">
    <ID>
        <ProductNumber>
```

```
            <Machine Value="MODEL1016"/>
            <Controller Value="A23B-2100-H110"/>
        </ProductNumber>
        <SerialNumber>
    <Machine Value="*"/>
            <Controller Value="*"/>
        </SerialNumber>
        <Customer>
            <MachineBuilder Value="00000110"/>
            <EndUser Value="00000005"/>
        </CustomerID>
    </ID>
    </MachineDef>
```

In order to clarify in each setting item in the setting file for which of the Machine 1 and Machine 2 the setting is intended for, Name="Machine1" or Name="Machine2" is designated.

Below, a portion of the setting file for setting the coordinate systems in a robot is shown. When this setting file is read, the user coordinate systems 1 and 2 of the robot and the tool coordinate system 3 are set.

```
<RobotData Name="Robot1" Item="$MNUFRAM(™)E" Value="1">
<SubData Item="$X" Value="-987.13"/>
    <SubData Item="$Y" Value="-45.53"/>
    <SubData Item="$Z" Value="-327.29"/>
    <SubData Item="$W" Value="0.00"/>
    <SubData Item="$P" Value="0.00"/>
    <SubData Item="$R" Value="-90.00"/>
</RobotData>
<RobotData Name="Robot1" Item="$MNUFRAM( ™)E" Value="2">
<SubData Item="$X" Value="-987.13"/>
    <SubData Item="$Y" Value="-45.53"/>
    <SubData Item="$Z" Value="-127.29"/>
    <SubData Item="$W" Value="0.00"/>
    <SubData Item="$P" Value="0.00"/>
    <SubData Item="$R" Value="-90.00"/>
</RobotData>
<RobotData Name="Robot1" Item="$MNUTOOL" Value="3">
        <SubData Item="$X" Value="55.00"/>
        <SubData Item="$Y" Value="138.00"/>
        <SubData Item="$Z" Value="676.00"/>
        <SubData Item="$W" Value="-180.00"/>
        <SubData Item="$P" Value="0.00"/>
        <SubData Item="$R" Value="180.00"/>
    </RobotData>
```

Here, the <RobotData Name="Robot1"> tag indicates relation to a robot controller defined as Robot 1, and <RobotData Name="Robot1" Item="$MNUFRAM™ E" Value="1"/> indicates correspondence to a user coordinate system 1. The coordinate system is defined as an XYZWPR value. By <SubData> from <RobotData> to </RobotData>, the XYZWPR value of the coordinate system is defined. Similarly, the tool coordinate system 3 of the robot controller Robot 1 is set by <RobotData Name="Robot1" Item="$MNUTOOL" Value="3">.

Here, the user coordinate system is a coordinate system that can be used when defining the loading and unloading operation by the robot. The user coordinate system is used to set the standby position until the automatic door of the machine tool opens, the entry path into the machine tool, the position of holding the workpiece, the exit path to the outside of the machine tool, and the like. The tool coordinate system is a coordinate system for defining the tool end of the robot hand. The robot controller 7 reads from the setting file the <RobotData> tags for items that are "$MNUFRW™ E" or "$MNUTOOL" and sets them in the parameter 34.

Below, a portion of a setting file for setting the relative correspondence of a machining program run at a machine tool and a work program run at a robot is shown.

```
    <CommonData Item="$PROGRAM" Value="1">
        <RobotData Name="Robot1" Item="$PNS" Value="0001">
            <MachineData Name="Machine1" Item="$O" Value="10">
    </CommonData>
    <CommonData Item="$PROGRAM" Value="2">
        <RobotData Name="Robot1" Item="$PNS" Value="0002">
            <MachineData Name="Machine1" Item="$O" Value="11">
    </CommonData>
    <CommonData Item="$PROGRAM" Value="3">
        <RobotData Name="Robot1" Item="$PNS" Value="0003">
            <MachineData Name="Machine1" Item="$O" Value="12">
    </CommonData>
```

Here, <CommonData>, indicates that the following setting values relate to both a machine tool and robot. Further, <CommonData Item="$PROGRAM" Value="1"> indicates settings in which the following settings relate to selection of a program when a workpiece part 1 is designated. Further, <RobotData Name="Robot1"> indicates running of a work program PNS0001 at a robot controller with a name defined as Robot1, and <MachineData Name="Machine1"> indicates running of a machining programO10 at a machine tool with a name defined as Machine1.

Similarly, when a workpiece part 2 is designated, a machining programO11 of a machine tool is run with respect to a work program PNS0002 of a robot. Further, when a workpiece part 3 is designated, a machining programO12 of a machine tool is run with respect to a work program PNS0003 of a robot. The robot controller 7 reads from the setting file the <CommonData> for items that are "$PROGRAM" and the <RobotData> for items that are "$PNS" and sets them in the parameter 35.

Below, a portion of the setting file defining I/O assignment in a machine tool and robot is shown.

```
    <CommonData Item="$IOMAP" Value="1">
    <RobotData Name="Robot1" Item="$UI" Value="1">
    <SubData Item="$Name" Value="*IMSTP"/>
    <SubData Item="$Comment" Value="*IMSTP"/>
        <SubData Item="$Rack" Value="81"/>
        <SubData Item="$Slot" Value="1"/>
        <SubData Item="$Offset" Value="1"/>
    </RobotData>
    <MachineData Name="Machine1" Item="$Y" Value="0.0">
    <SubData Item="$Name" Value="*IMSTP"/>
    <SubData Item="$Comment" Value="Robot Immediate stop"/>
        <SubData Item="$Rack" Value="81"/>
        <SubData Item="$Slot" Value="2"/>
        <SubData Item="$Offset" Value="1"/>
    </MachineData>
    </CommonData>
    <CommonData Item="$IOMAP" Value="2">
    <RobotData Name="Robot1" Item="$UI" Value="2">
    <SubData Item="$Name" Value="*HOLD"/>
    <SubData Item="$Comment" Value="*Hold"/>
        <SubData Item="$Rack" Value="81"/>
        <SubData Item="$Slot" Value="1"/>
        <SubData Item="$Offset" Value="2"/>
    </RobotData>
    <MachineData Name="Machine1" Item="$Y" Value="0.1">
    <SubData Item="$Name" Value="*HOLD"/>
    <SubData Item="$Comment" Value="Robot Hold"/>
        <SubData Item="$Rack" Value="81"/>
        <SubData Item="$Slot" Value="2"/>
        <SubData Item="$Offset" Value="2"/>
    </MachineData>
    </CommonData>
    <CommonData Item="$IOMAP" Value="3">
    <RobotData Name="Robot1" Item="$UI" Value="3">
    <SubData Item="$Name" Value="*SFSPD"/>
    <SubData Item="$Comment" Value="*SFSPD"/>
```

-continued

```
    <SubData Item="$Rack" Value="81"/>
    <SubData Item="$Slot" Value="1"/>
    <SubData Item="$Offset" Value="3"/>
</RobotData>
<MachineData Name="Machine1" Item="$Y" Value="3">
<SubData Item="$Name" Value="*SFSPD"/>
<SubData Item="$Comment" Value="Robot Safety Speed"/>
    <SubData Item="$Rack" Value="81"/>
    <SubData Item="$Slot" Value="2"/>
    <SubData Item="$Offset" Value="3"/>
</MachineData>
</CommonData>
```

In the above example, assignment with respect to three interlock signals *IMSTP, *HOLD, and SFSPD output from the robot to the machine tool is defined. <CommonData> indicates that the following setting values relate to both the machine tool and the robot, and <CommonData Item="$IOMAP" Value="1"> indicates that the following settings are I/O assignment settings with respect to the interlock signal 1. Further, <RobotData Name="Robot1" Item="$UI" Value="1"> defines that in a robot controller with a name defined as Robot1, the interlock signal 1 is referred to by UI[1] and the signal name is *IMSTP.

<SubData Item="$Rack"> and <SubData Item="$Slot"> designate the IO devices for signal communication. In this case, it is connection by the network interface 21 through the network cable 9 to the network node 1. <SubData Item="$Offset"> designates what number signal from the start of an I/O region of the other party in a connection a signal is.

It is possible to designate in which case a setting file can be used by the ID designated by the <ID> tag. When a machine number is designated using the <ID> tag, the setting file can be used only for the specific machine type. Further, when a part number is designated using the <ID> tag, the setting file can be used only for a specific robot or machine tool.

Further, when a user number is designated using the <ID> tag, the setting file can be used only for a product manufactured for a certain system house or machine tool manufacturer. Further, when using the <ID> tag to combine a machine number and user number to designate a setting file, a setting file can be created that can be applied only for certain machine types sent to certain users.

Further, when there are only a few patterns of contents of settings, a certain system house will accept only assignments of user numbers according to the number of patterns of the contents of settings. Further, it is possible to prepare a setting file for each pattern and then select the pattern of contents of settings using the user number.

In the above embodiments, the setting files 25, 26, 27 and 28 created by the PC 8 are transferred to the storage device 17, ID's 50 of the machine tools 5 and 6 are acquired through the network interface 21, and a setting file is selected based on the acquired ID's to set the parameters 33, 34, and 35.

Similarly, ladder programs or work programs created by the PC 8 may be transferred from the hard disk device 24 to the storage device 17, ID's 50 of the machine tools 5 and 6 acquired, the ladder programs or work programs corresponding to the ID's of the machine tools 5 and 6 transferred from the storage device 17 to the memory 16, and the control program 18 and ladder execution unit 44 used to run these programs.

Further, in the present embodiment, the setting files 25, 26, 27, and 28 created by the PC 8 are transferred from the hard disk device 24 to the storage device 17 through the network interface 21 and network cable 12 using the procedure of FIG. 5. However, in the robot controller 7 and CNC controllers 40 and 41, the teaching operation panel 31 and operation panels 42 and 43 may also be used to give the control program 18 a setting file creation function, the setting files may be directly created in the memory 16 without using the PC 8, and these setting files may be stored in the storage devices 17.

However, when a PC 8 is used as in the present embodiment, the setting files can be created in advance without using the robot controller 7 and CNC controllers 40 and 41. Therefore, in the present invention, setting files can be created even not by users of the robot and machine tool. For example, it is also possible for the designers of the robots and machine tools, designers of the production systems, integrators, and engineers of the machine tool builders to prepare the setting files and provide them to the users.

In the past, if providing setting contents determined at the time of design by such a method, there was the possibility that the inherent functions of the robots and machine tools could not be sufficiently exhibited and, further, that incorrect contents would end up being set with respect to the robots and machine tools. However, in the present invention, ID's are used to apply setting files to only specific machine types or individual devices or specific users. Accordingly, use of setting files by the user on the wrong machine types can be prevented. Further, setting files tailored to the system configurations can also be provided.

Further, in the present invention, ID's may be used to set conditions for application of setting files in the setting files. Accordingly, designers may provide setting files to users without worry. Further, without requiring the user to know the contents of the setting file at time of application and without requiring the user to be aware of where the setting file is stored, the optimum setting file is automatically selected and the robot and machine tool are automatically set. Therefore, users do not have to be aware of startup setting work at all.

Further, in the present invention, the workers send an automatic setting start instruction 61 using the teaching operation panel 31 or operation panels 42 and 43. However, automatic setting may be automatically executed before or after running the production system. Further, if the ID acquisition unit 52 receives an ID from each device through the procedure of FIG. 15 and the contents of the newly created received ID management table (FIG. 16) are different from the contents in the prior management table, automatic setting using the new management table is easily realizable.

In such way, in the present invention, by using a setting file prepared in advance, robots and/or machine tools can be automatically set by the robot controller. Therefore, even when the setting contents differ according to the type of machine tools or robots, the robot controller can set the devices based on their type. Accordingly, machine tool and robot startup work can be simply and easily performed without requiring skill or increasing the startup man-hours. Therefore, even in cases where the configuration of the production system changes and cases assuming a plurality of production systems with different configurations, the setting contents can be simply and quickly adjusted without error according to the configuration of the required production system.

Further, in the present invention, not users of the robots and machine tools, but designers of the robots and machine tools can create setting files in advance and provide them to the users. Therefore, even in cases where the end users of robots and machine tools do not perform startup settings, the end users can immediately use the robots and machine tools.

For these reasons, in the present invention, use of robots in loading and unloading work of workpieces to and from machine tools is promoted, thereby increasing machine tool productivity. Further, workers are freed from loading and unloading work of workpieces to and from machine tools, so the probability of physical danger to the workers drops. Thus, workers can perform operations for long periods of time.

EFFECT OF INVENTION

In the first aspect, the robot controller is set based on a type and number of machine tools. Therefore, even when the contents of the settings differ according to the types of machine tools and robots, the robot controller can be set according to those types. Accordingly, machine tool and robot startup work can be simply and easily performed without requiring skill or increasing the startup man-hours. Further, the setting work is automatic, so setting mistakes can also be prevented. Note that, the machine tools are set to match the settings of the robots, so there are no conflicts in the contents of the settings of the machine tools and robots.

The setting files used in the second aspect are created in advance by the designers of the robots or machine tools and stored in the robot controller. Thus, without requiring further skill, the end user is able to automatically install the startup settings for the robots and machine tools using the setting files.

In the third aspect, by sending a signal uniquely determined based on the type of the machine tool, that is, by sending an ID, a type and number of machine tools are detected. Therefore, without requiring further skill, the end user is able to install settings according to a type and number of machine tools.

In the fourth aspect, the robot controller is set based on setting information from a machine tool. Therefore, even when the contents of settings differ according to the types of machine tools and robots, the robot controller can be set according to such types. Accordingly, without requiring skill or increasing startup man-hours, machine tool and robot startup work can be simply and easily carried out. Further, the setting work is automatic, so setting mistakes can also be prevented. Note that, the robots are set to match the settings of the machine tools, so there are no conflicts in the contents of the settings of the machine tools and robots. Note that, further, the "setting information" in the fourth aspect means a setting file or parameter setting instructions or other contents of settings for setting the robot controller selected according to a type and number of robots.

The setting files used in the fifth aspect are created in advance by the designers of the robots or machine tools and stored in the robot controller. Therefore, without requiring further skill, the end user is able to automatically install startup settings for a robot and machine tool using the setting files.

In the sixth aspect, by sending a signal uniquely determined based on the robot type, that is, by sending an ID, a type and number of robots are detected. Therefore, without requiring further skill, the end user is able to install settings according to a type and number of robots.

In the seventh aspect, both a robot and machine tool can be simultaneously set, so conflicts in the contents of settings of the robot and machine tool can be prevented.

Although the invention has been shown and described with exemplary embodiments thereof, it should be understood by those skilled in the art that the foregoing and various other changes, omissions and additions may be made therein and thereto without departing from the scope of the invention.

The invention claimed is:

1. A robot controller controlling a robot used combined with machine tools, said robot controller provided with
    a communication unit connecting the robot controller to the machine tools,
    a detection unit detecting through the communication unit a type and number of the machine tools, and
    a setting unit selecting one setting file from a plurality of setting files for the robot controller stored in the robot controller and setting parameters in the robot controller using parameters listed in the one setting file based on the type and number of the machine tools detected by the detection unit
    wherein the selected setting file has recorded in it setting information of the robots and setting information of the machine tool, and, when installing settings of a robot based on setting information of the robot recorded in the selected setting file, the controller sets the machine tool based on the setting information of the machine tool recorded in the setting file.

2. The robot controller as set forth in claim 1, wherein the detection unit uses a signal transmitted from a machine tool to the robot controller and uniquely determined based on the type of the machine tool to detect a type and number of the machine tools.

3. A robot controller controlling robots used combined with a machine tool, said robot controller provided with
    a communication unit connecting the robot controller to the machine tool,
    a notification unit notifying through the communication unit a type and number of the robots, and
    a setting unit setting parameters in the robot controller using parameter information listed one setting file selected from a plurality of setting files for the robot controller stored in the robot controller based on the type and number of robots in setting information transmitted from the machine tool through the communication unit
    wherein the selected setting file has recorded in it setting information of the robots and setting information of the machine tool, and, when installing settings of a robot based on setting information of the robot recorded in the selected setting file, the controller sets the machine tool based on the setting information of the machine tool recorded in the setting file.

4. The robot controller as set forth in claim 3, wherein the notification unit uses a signal transmitted from the machine tool to the robot controller and uniquely determined based on the type of the machine tool to notify a type and number of the robots.

* * * * *